United States Patent
Jin et al.

(10) Patent No.: US 9,980,131 B2
(45) Date of Patent: May 22, 2018

(54) MOBILE TERMINAL, DEVICE AND CONTROL METHOD THEREOF

(71) Applicant: SAMSUNG ELECTRONICS CO., LTD., Suwon-si (KR)

(72) Inventors: Ho Jin, Yongin-si (KR); Sang-joon Park, Seoul (KR); Sung-ho Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 14/560,162

(22) Filed: Dec. 4, 2014

(65) Prior Publication Data

US 2015/0163672 A1 Jun. 11, 2015

(30) Foreign Application Priority Data

Dec. 11, 2013 (KR) ......................... 10-2013-0153695

(51) Int. Cl.
*H04L 29/06* (2006.01)
*H04W 12/06* (2009.01)

(52) U.S. Cl.
CPC .................. *H04W 12/06* (2013.01)

(58) Field of Classification Search
CPC ..... H04W 12/06; H04W 4/008; H04W 12/00; H04W 76/02; H04W 12/08; H04W 48/16; G06F 21/35; H04L 63/08
USPC .......................................................... 726/3
See application file for complete search history.

(56) References Cited

U.S. PATENT DOCUMENTS

| | | | |
|---|---|---|---|
| 8,019,609 B2 | 9/2011 | Tamir et al. | |
| 8,191,161 B2 | 5/2012 | Sanchez et al. | |
| 8,396,452 B1* | 3/2013 | Matsuoka | G06F 21/35 |
| | | | 455/410 |
| 2006/0183462 A1* | 8/2006 | Kolehmainen | H04B 5/00 |
| | | | 455/411 |

(Continued)

FOREIGN PATENT DOCUMENTS

JP 2005-338995 12/2005

OTHER PUBLICATIONS

"Wearable Key: Device for Personalizing nearby Environment", Nobuyuki Matsushita et al., Proceedings of the Fourth International Symposium on Wearable Computers (ISWC'00), 2000 IEEE.

*Primary Examiner* — Yogesh Paliwal
(74) *Attorney, Agent, or Firm* — Staas & Halsey LLP

(57) ABSTRACT

A device includes: a short-range communicator which is configured to communicate with at least one mobile terminal by a short-range communication method; and a controller which is configured to determine whether a mobile terminal targeted for approaching is a registered mobile terminal if it is detected that the mobile terminal approaches the device, and controls the short-range communicator to receive the first authentication information corresponding to the device from the approached mobile terminal if the approached mobile terminal is determined as the registered mobile terminal, and authenticate a user of the device through the received first authentication information. With this, a user can be authenticated by a simple method of making the mobile terminal approach the device without inputting his/her authentication information, thereby improving user's convenience and strengthening security effect.

17 Claims, 22 Drawing Sheets

(56) References Cited

U.S. PATENT DOCUMENTS

| | | | |
|---|---|---|---|
| 2011/0072501 A1* | 3/2011 | Fukui | H04L 9/3226 726/8 |
| 2012/0096368 A1 | 4/2012 | McDowell | |
| 2012/0297187 A1* | 11/2012 | Paya | H04L 63/0492 713/156 |
| 2013/0031150 A1* | 1/2013 | Kamath | G06F 17/2264 707/827 |
| 2015/0096001 A1* | 4/2015 | Morikuni | H04L 63/08 726/7 |

* cited by examiner

MOBILE TERMINAL, DEVICE AND CONTROL METHOD THEREOF

CROSS-REFERENCE TO RELATED APPLICATIONS

This application claims priority from Korean Patent Application No. 10-2013-0153695, filed on Dec. 11, 2013 in the Korean Intellectual Property Office, the disclosure of which is incorporated herein by reference.

BACKGROUND

1. Field

Apparatuses and methods consistent with the exemplary embodiments relate to authentication of a device, and more particularly to a mobile terminal, a device and a control method thereof, in which the device is authenticated using the mobile terminal and uses a cloud service.

2. Description of the Related Art

Recently, use of a computer, a smart television (TV), a tablet personal computer (PC), a smart phone, or the like various digital devices has been on the rise, and thus importance of security has also been growing. Accordingly, various user authentication methods have been applied to a device and applications installed in the device.

User authentication includes device authentication for using a device, and service authentication for using a certain service through the device. For example, the service authentication may include a user's login to an application installed in a smart phone.

Typically, the device authentication may be performed by inputting user information registered to an operating system (OS) of the device, i.e., a password, or by inputting a certain pattern on a display.

For the service authentication, identification (ID) and a password are input for a user's login. At this time, auto login may be often achieved by storing the ID and password for a certain application in a corresponding device, and using the stored local information when the application is executed.

However, in the case of the device authentication, there is a possibility of leakage of the password or pattern. Also, a smart phone or the like mobile device generally makes it impossible to register a plurality of users thereto, and allows the authentication of only one registered user. Meanwhile, a plurality of users may be registered to the tablet PC, but in this case it is difficult to ensure privacy among them while they use e-mail, social network service (SNS), etc.

Also, in the case of the service authentication, it is cumbersome for a user to remember and input an ID and a password whenever the application is executed. If the information for the device authentication is leaked in the state that the auto login is applied to the service authentication, it is difficult to actually expect a security effect.

In the meantime, demands for a cloud service that provides a data storage area of a remote storage place separated from the device has increased following the trend that a user uses multiple devices. Accordingly, there is a need of strengthening the competitiveness of the cloud service so that a plurality of devices can safely and efficiently store and share data.

SUMMARY

Additional aspects and/or advantages will be set forth in part in the description which follows and, in part, will be apparent from the description, or may be learned by practice of the invention.

According to an aspect of an exemplary embodiment, a mobile terminal is provided including: a short-range communicator which is configured to communicate with at least one device by a short-range communication method; a storage which is configured to store information about a registered device and first authentication information corresponding to the registered device; and a controller which is configured to determine whether a device targeted for approaching is the registered device if it is sensed that the mobile terminal approaches the device, and controls the short-range communicator to send the device the first authentication information corresponding to the device if the device is determined as the registered device.

The storage may further store second authentication information corresponding to an application that is executed in the device, and the controller controls the short-range communicator to send the device the second authentication information in response to execution of the application in the device.

The application may include a web browser, and the second authentication information may include user information for logging on to a web page accessed by the web browser.

The storage may store and manage an application name and type corresponding to the application that is executed in the device, or a web address and a web page title corresponding to the web page.

The application may include an application that provides a civil service or a financial service, and the second authentication information may include public certification information for using the civil service or the financial service.

The storage may store third authentication information for using the mobile terminal, and the third authentication information may include biometrics information of a user.

The short-range communicator may employ at least one communication method among ultrasonic-wave communication, Wi-Fi, Bluetooth, near field communication (NFC), radio frequency (RF) communication, infrared communication, universal serial bus (USB), and an audio jack.

The short-range communicator may receive a device authentication result based on the first authentication information from the device, and the mobile terminal may further include an output section to output the received authentication result.

The mobile terminal may further include a network communicator which is configured to perform network communication with a cloud server providing a cloud service, and the controller may control the network communicator to make the mobile terminal access the cloud server in response to authentication of the device.

The cloud service may include at least one of a clipboard service and a web-hard service, and the mobile terminal further may include an output section to output a notification corresponding to at least one of generating, adding and modifying clipboard data or web-hard data stored in the cloud server.

The mobile terminal may include at least one of a digital pen, a wristband, a watch, a smart phone, a tablet computer, a portable media player, a digital camera and a camcorder.

According to an aspect of another exemplary embodiment, a device includes: a short-range communicator which is configured to communicate with a mobile terminal by a short-range communication method; and a controller which is configured to determine whether the mobile terminal is a registered mobile terminal if it is sensed that the mobile terminal approaches the device, control the short-range communicator to receive the first authentication information corresponding to the device from the mobile terminal if the mobile terminal is determined as the registered device, and authenticate a user of the device through the received first authentication information.

The short-range communicator may further receive second authentication information corresponding to an application that is executed in the device, and the controller may control the short-range communicator to receive the second authentication information from the mobile terminal in response to execution of the application in the device.

The device may further include a network communicator which is configured to receive from a cloud server second authentication information corresponding to an application that is executed in the device, wherein the controller controls the network communicator to receive the second authentication information from the cloud server in response to execution of the application in the device.

The application may include a web browser, and the second authentication information may include user information for logging on to a web page accessed by the web browser.

The application may include an application that provides a civil service or a financial service, and the second authentication information may include public certification information for using the civil service or the financial service.

The short-range communicator may employ at least one communication method among ultrasonic-wave communication, Wi-Fi, Bluetooth, near field communication (NFC), radio frequency (RF) communication, infrared communication, universal serial bus (USB), and an audio jack.

The short-range communicator may send the mobile terminal a device authentication result based on the first authentication information.

The device may further include a network communicator which is configured to communicate with a cloud server providing a cloud service; and an output section which is configured to display a cloud user interface (UI) corresponding to the cloud service.

The short-range communicator may further receive from the mobile terminal a reproducing request for the cloud UI, and the controller may control the output section to display the cloud UI in response to the reproduction request from the mobile terminal.

The network communicator may transmit the first authentication information to the cloud server, and receive an authentication result of the cloud service from the cloud server.

The cloud service may include at least one of a clipboard service and a web-hard service, and the output section may output a notification corresponding to at least one of generating, adding and modifying clipboard data or web-hard data stored in the cloud server.

The output section may display the cloud UI corresponding to an operation state of the device.

The cloud UI may include a list of clipboard data stored in the cloud server, and the output section may display the clipboard data list by extracting data corresponding to an application installed in the device.

The cloud service may include at least one of a clipboard service and a web-hard service, and the cloud UI may include at least one of additional information and advertisement information related to the clipboard service or web-hard service.

The controller may set up a region of interest to be stored in a clipboard with regard to successive motion of a user touch on a touch screen of the device, and control the network communicator to store data of the region of interest in the clipboard of the cloud server.

The controller may control the network communicator to extract and transmit information about the region of interest to the cloud server.

The controller may control the network communicator to further extract and transmit meta data about the region of interest to the cloud server.

According to an aspect of another exemplary embodiment, a method of controlling a mobile terminal includes: detecting that the mobile terminal approaches a device; determining whether the device targeted for approaching is a registered device, based on stored registered device information; and sending the device first authentication information corresponding to the device by a short-range communication method if the device is determined as the registered device.

The mobile terminal may further store second authentication information corresponding to an application that is executed in the device, the method may further including sending the device the second authentication information by the short-range communication method in response to execution of the application in the device.

The application may include a web browser, and the second authentication information may include user information for logging on to a web page accessed by the web browser.

A storage of the mobile terminal may store and manage an application name and type corresponding to the application that is executed in the device, or a web address and a web page title corresponding to the web page.

The application may include an application that provides a civil service or a financial service, and the second authentication information may include public certification information for using the civil service or the financial service.

The mobile terminal may further store third authentication information for using the mobile terminal, and the third authentication information may include biometrics information of a user, the method further including authenticating use of the mobile terminal, based on the third authentication information.

The short-range communication method may include at least one among ultrasonic-wave communication, Wi-Fi, Bluetooth, near field communication (NFC), radio frequency (RF) communication, infrared communication, universal serial bus (USB), and an audio jack.

The method may further include receiving a device authentication result based on the first authentication information from the device by a short-range communication method, and outputting the received authentication result.

The method may further include making the mobile terminal access a cloud server, which provides a cloud service, in response to authentication of the device.

The cloud service may include at least one of a clipboard service and a web-hard service, the method further including outputting a notification corresponding to at least one of generating, adding and modifying clipboard data or web-hard data stored in the cloud server.

The mobile terminal may include at least one of a digital pen, a wristband, a watch, a smart phone, a tablet computer, a portable media player, a digital camera and a camcorder.

According to an aspect of another exemplary embodiment, a method of controlling a device includes: detecting that a mobile terminal approaches the device; determine whether the approached mobile terminal is a registered mobile terminal, based on stored information about the registered mobile terminal; receiving first authentication information corresponding to the device from the mobile terminal by a short-range communication method if the approached mobile terminal is determined as the registered device; and authenticating a user of the device through the received first authentication information.

The method may further include receiving second authentication information corresponding to an application, which is executed in the device, by the short-range communication method in response to execution of the application in the device.

The method may further include receiving second authentication information corresponding to an application that is executed in the device, by a network communication method from the cloud server in response to execution of application in the device.

The application may include a web browser, and the second authentication information may include user information for logging on to a web page accessed by the web browser.

The application may include an application that provides a civil service or a financial service, and the second authentication information may include public certification information for using the civil service or the financial service.

The short-range communication method may include at least one among ultrasonic-wave communication, Wi-Fi, Bluetooth, near field communication (NFC), radio frequency (RF) communication, infrared communication, universal serial bus (USB), and an audio jack.

The method may further include sending the mobile terminal a device authentication result based on the first authentication information.

The method may further include a cloud user interface (UI) corresponding to the cloud service provided by the cloud server.

The method may further include receiving from the mobile terminal a reproducing request for the cloud UI, and the displaying the cloud UI may include displaying the cloud UI in response to the reproduction request from the mobile terminal.

The method may further include transmitting the first authentication information to the cloud server; and receiving an authentication result of the cloud service from the cloud server.

The cloud service may include at least one of a clipboard service and a web-hard service, the method further including outputting a notification corresponding to at least one of generating, adding and modifying clipboard data or web-hard data stored in the cloud server.

The cloud UI may be displayed corresponding to an operation state of the device.

The cloud UI may include a list of data stored in the clipboard server, and the displaying the cloud UI may include displaying the data list by extracting data corresponding to an application installed in the device.

The cloud service may include at least one of a clipboard service and a web-hard service, and the displaying the cloud UI may include displaying at least one of additional information and advertisement information related to the clipboard service or web-hard service.

The method may further include receiving successive motion of a user touch on a touch screen of the device; setting up a region of interest to be stored in a clipboard with regard to the user touch; and storing data of the region of interest in the clipboard of the cloud server.

The method may further include extracting and transmitting information about the region of interest to the cloud server.

The transmitting the information to the cloud server may include extracting and transmitting meta data about the region of interest to the cloud server.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings.

Figure 1:
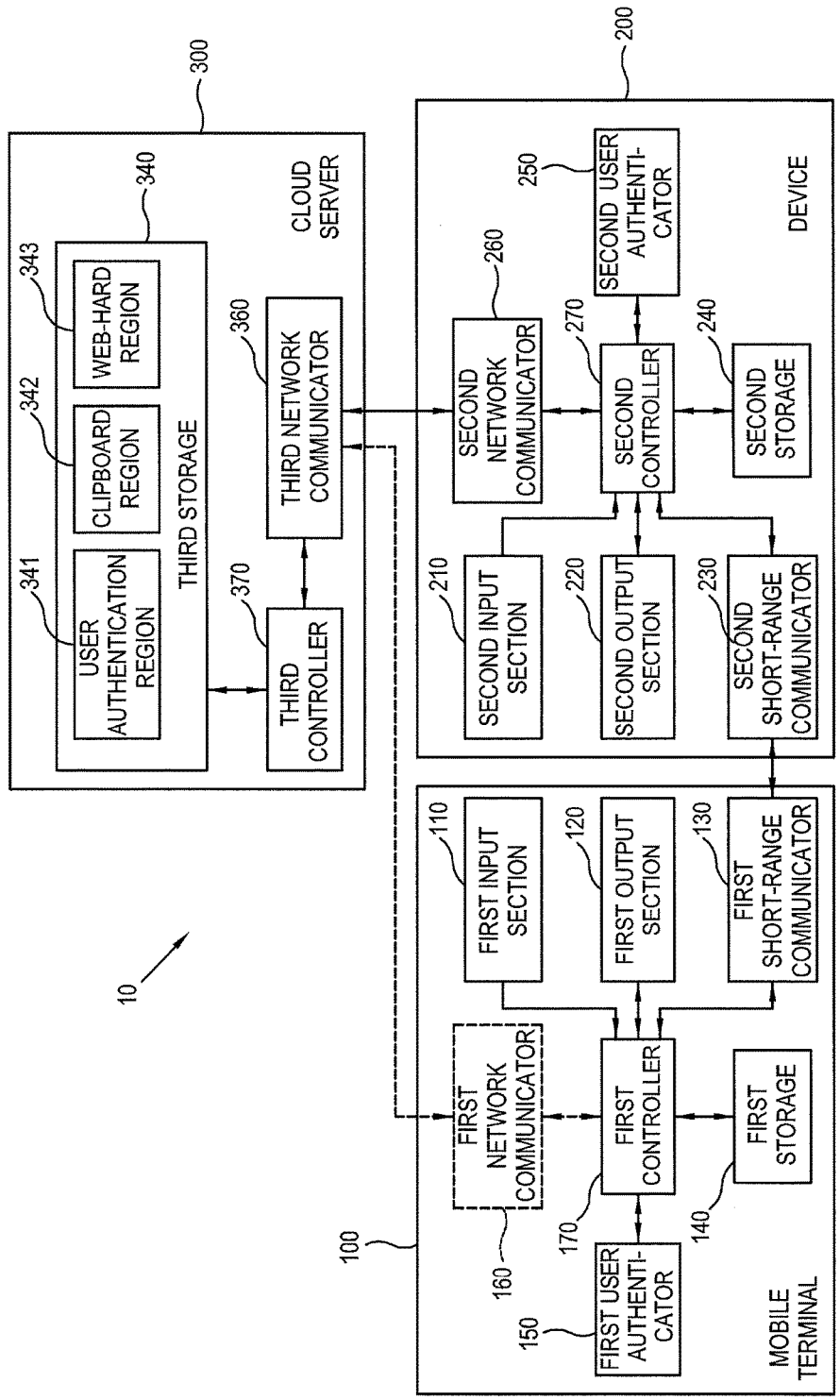
FIG. 1 is a block diagram of a device authentication system according to an exemplary embodiment.

FIG. 1 is a block diagram of a device authentication system according to an exemplary embodiment;

As shown in FIG. 1, a device authentication system 10 according to an exemplary embodiment includes a mobile terminal 100 where authentication information is stored, a device 200 where at least one application is installed, and a cloud server 300 for managing the device 200.

In this exemplary embodiment, the mobile terminal 100 is capable of storing the authentication information and transmitting it to the device 200. The mobile terminal 100 may be any of a digital pen, a wristband, a watch, or the like digital device that is easy for a user to carry (which is also called a digital accessory, a smart accessory, or Appcessory); a cellular phone (e.g., a smart phone); a tablet PC; a portable media player (e.g., an MP3 player); a digital camera; a camcorder; etc. Here, the mobile terminal 100 achieved in the form of a wristband, a watch, etc. may serve as a wearable computing device that has recently been in the limelight.

The mobile terminal 100 stores the authentication information corresponding to at least one device 200, and transmits the authentication information to the device 200 when the mobile terminal 100 approaches the corresponding device 200. Here, the term approaching may include the mobile terminal 100 or the device 200 moving towards the other, the mobile terminal 100 and the device 200 being within a predetermined distance of each other, or the mobile terminal 100 and the device 200 contacting each other.

To this end, the mobile terminal 100 may further store registered device information about at least one device 200 that is a target to which the authentication information is transmitted.

The authentication information is user account information for authentication with regard to the device 200, and may for example include identification (ID) and a password (PW). As necessary, two or more devices may use one user account.

Also, in this exemplary embodiment, the mobile terminal 100 and the device 200 may use the same account. As necessary, a plurality of devices (refer to 201, 202 and 203 of FIG. 8), for example, a smart phone 201 and a tablet PC 202 may use one user account.

In this exemplary embodiment, user authentication includes device authentication for using the device 200, and service authentication for using a certain service of the device, for example, an application installed in the device.

Figure 5:
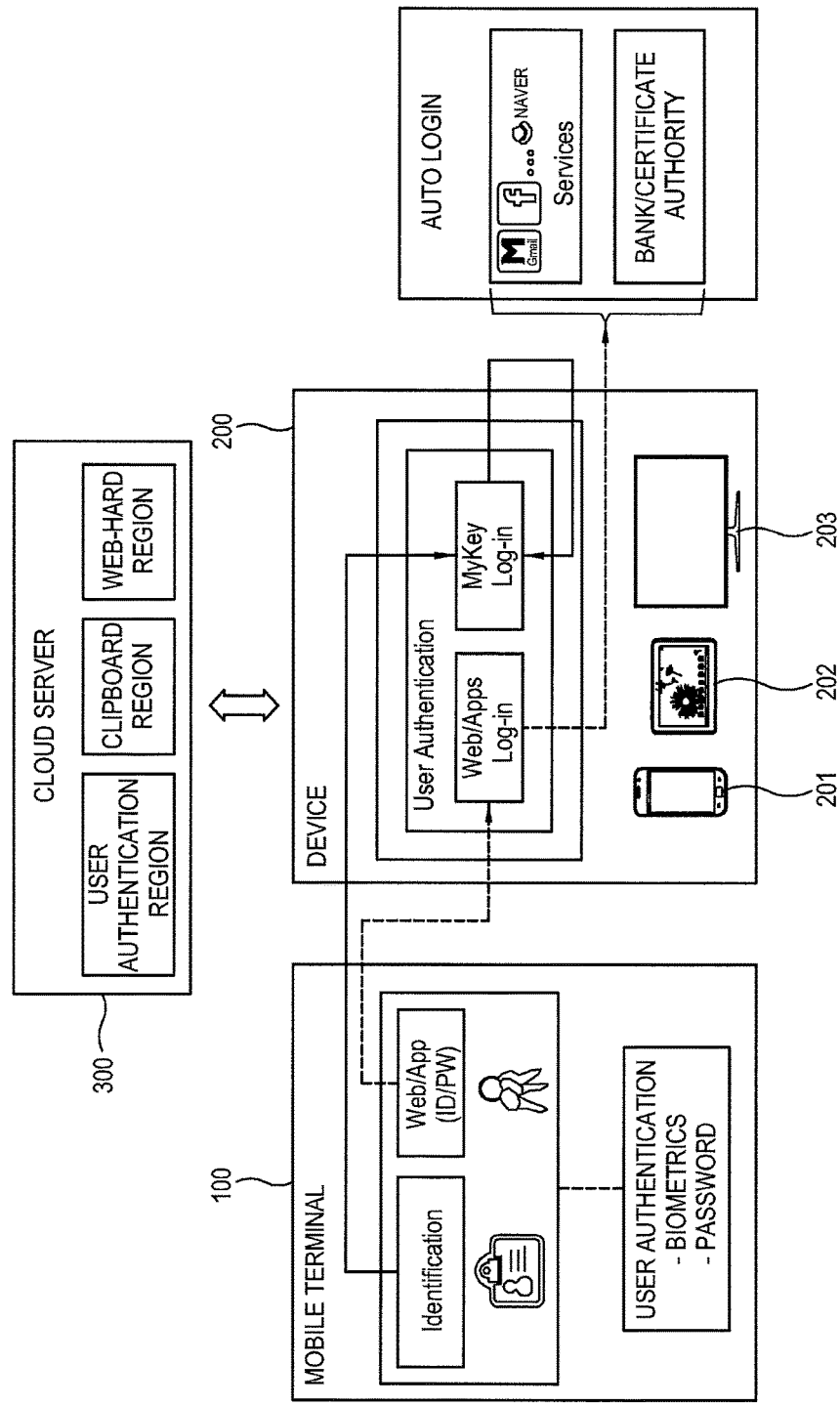
FIG. 5 is a view showing a user authentication system according to a first exemplary embodiment.

The mobile terminal 100 may further include the authentication information for the service authentication, and the service authentication information may be transmitted from the mobile terminal 100 to the device 200 in response to execution of application in the device 200 (see e.g., a first exemplary embodiment of FIG. 5). Here, the service authentication information may be stored in the cloud server 300 and transmitted to the device 200 (see e.g., a second exemplary embodiment of FIG. 6).

The device 200 is installed with one or more applications. In this exemplary embodiment, the device authentication system 10 may include a plurality of devices (refer to 201, 202 and 203 of FIG. 8).

Figure 15:
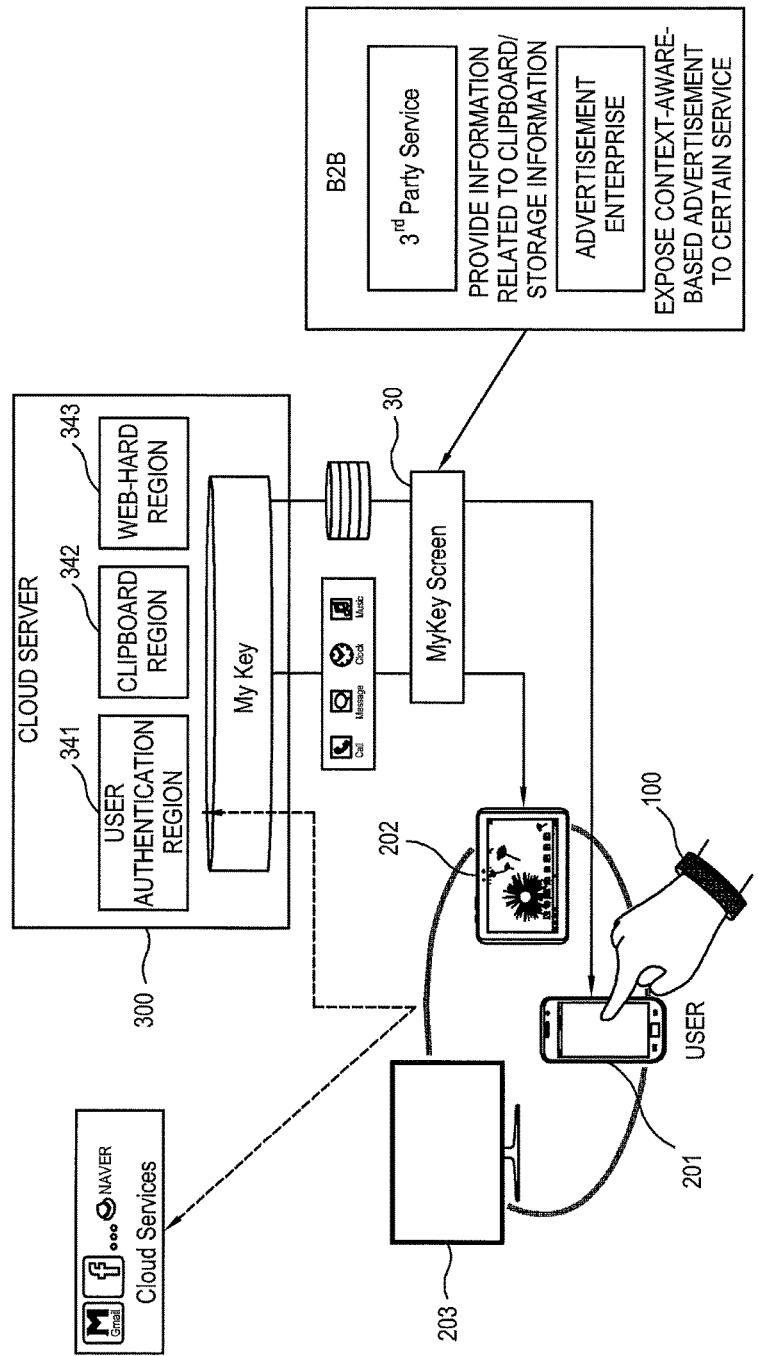
FIG. 15 is a view showing a cloud system according to a third exemplary embodiment.

The device 200 may access the cloud server 300 and receive various services (see e.g., a third exemplary embodiment of FIG. 15).

In this exemplary embodiment, the device 200 may be achieved by a TV (e.g., a smart TV or an internet protocol (IP) TV), a desktop computer, a laptop computer (e.g., a notebook), a tablet PC, a mobile phone (e.g., a smart phone), a navigation system for a vehicle, a portable media player (e.g., an MP3 player), a digital camera, a camcorder, or the like various digital devices in which one or more applications can be installed.

The cloud server 300 manages information of the mobile terminal 100 and the device 200, and provides a cloud service to the mobile terminal 100 and the device 200. The mobile terminal 100 and the device 200 access the cloud server 300 through wired or wireless communication. In this exemplary embodiment, the cloud service provided by the cloud server 300 may include a storage service and a clipboard service (to be described later).

As shown in FIG. 1, the mobile terminal 100 includes a first input section 110, a first output section 120, a first short-range communicator 130, a first storage 140, a first user authenticator 150 and a first controller 170. The mobile terminal 100 according to this exemplary embodiment may further include a first network communicator 160 as necessary.

The first input section 110 receives a user's input, and transmits various preset control commands or non-limited information to the first controller 170 in response to the received user's input.

The first input section 110 may include one or at least two physical keypads, i.e., buttons provided in the mobile terminal 100, and a virtual keypad, i.e., a user interface (UI) displayed to be selected by a user on a display (not shown). Here, if the display is a touch screen, the first input section 110 sends the first controller 170 a command corresponding to a user's input received when the user touches the UI, and the first input section 110 receives a user's input based on interaction with contents displayed on the touch screen, i.e., a touch or a touch gesture. Also, if the mobile terminal 100 is a digital device capable of performing voice recognition, the first input section 110 may further include a microphone.

The first output section 120 may include the display (not shown) for displaying an image, and a sound output section (not shown) for outputting voice or sound. The display may be for example achieved by various display types such as liquid crystal, plasma, a light-emitting diode, an organic light-emitting diode, a surface-conduction electron-emitter, a carbon nano-tube, a nano-crystal, etc., but not limited thereto. The sound output section may include one or at least two speakers.

The first short-range communicator 130 may perform short-range communication with the device 200. Here, the first short-range communicator 130 transmits the first authentication information for the device authentication to the corresponding device 200.

In this exemplary embodiment, the short-range communication may for example employ ultrasonic-wave communication. If information is exchanged through data communication using ultrasonic waves, most of the devices may be used as they are without adding a new sensor/hardware to the devices 100 and 200, and it is thus advantageous since there is no need of complicated previous settings.

Figure 2:
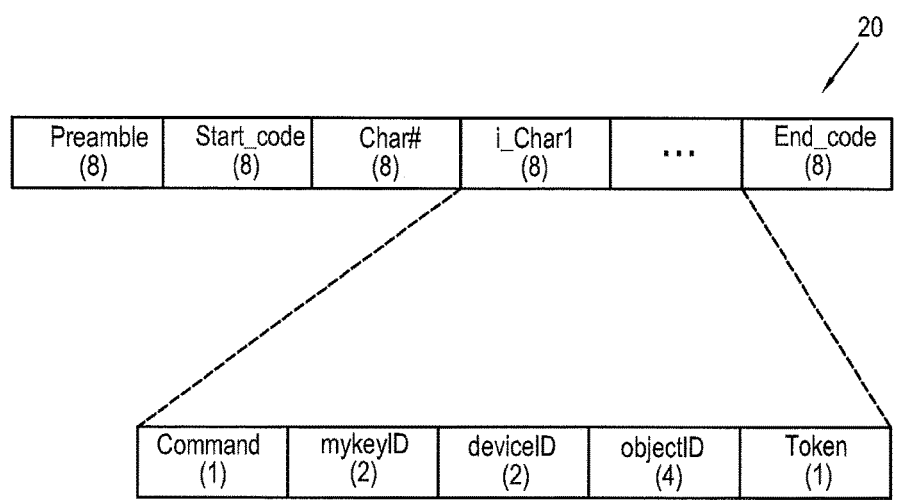
FIGS. 2 to 4 are views for explaining a short-range communication process using ultrasonic-wave communication according to an exemplary embodiment.
Figure 3:
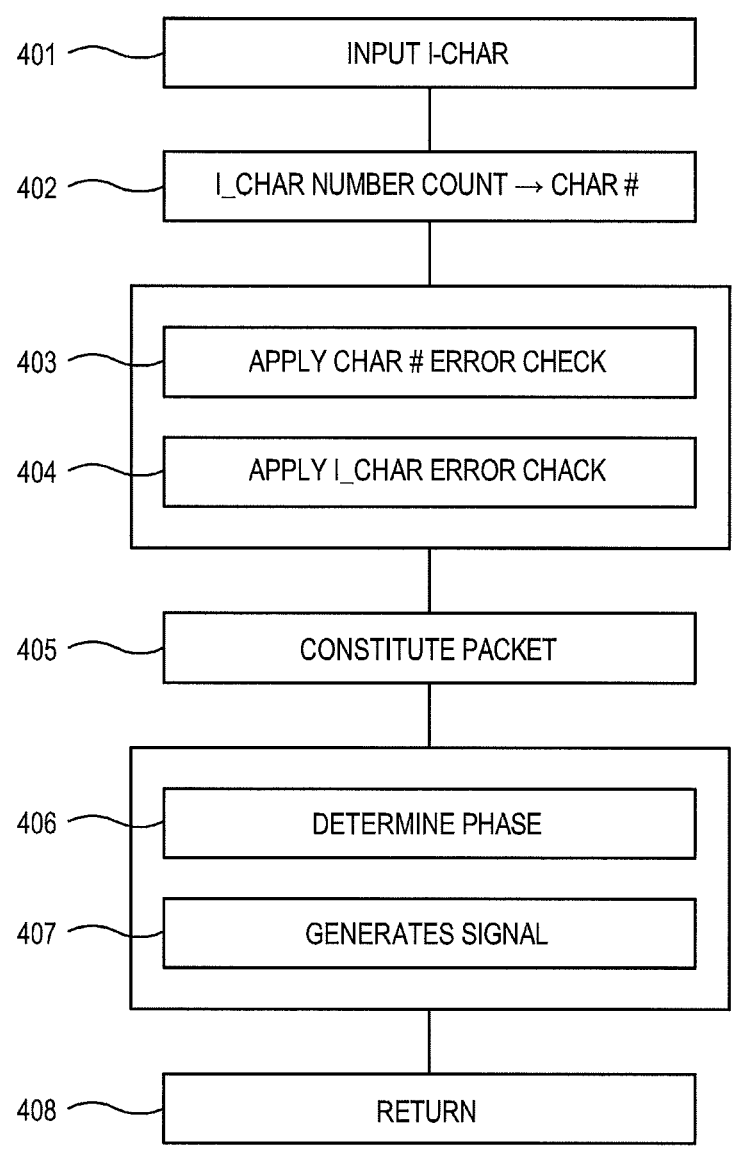
Figure 4:
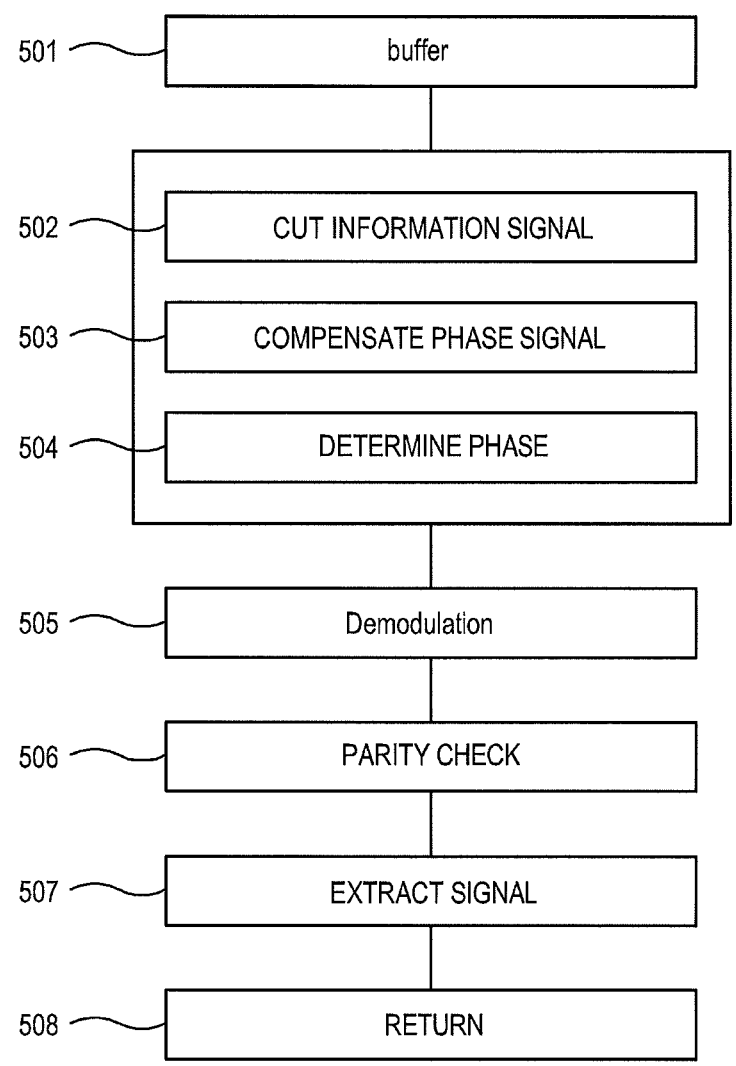

FIGS. 2 to 4 are views for explaining a short-range communication process using ultrasonic-wave communication according to an exemplary embodiment;

As shown in FIG. 2, a packet 20 used in the ultrasonic-wave communication includes a total of 10 unit packets (i.e., information character), and each unit packet uses 10 bits. Thus, a total bits of the communication packets 20 is 8+8+8+(8*10)+8=112 bits (i.e., 14 bytes).

Code information in the packet 20 has priority in order of char#→i_Char→preamble, Start_code, and end_code, and, technological difficulty of parity according to the order of priority is set up as follows.

Internal bit "1" count low 3 bit parity: Char#
Internal bit "1" even-odd low 1 bit parity: char
Information included in items that constitute the packet 20 of FIG. 2 is as follows.
Preamble includes information for indicating start of the packet, and codes for synchronization and phase determination, in which a hybrid synchronization method may be used.
Start_code and End_code indicate the start and end of the information char, respectively.
Char# shows a total number of information chars, and is used when combining the packets.
i_Char includes actual information, i.e., the first authentication information, and includes Command, mykeyID, deviceID, objected and Token as shown in FIG. 2, in which a total of 10 i_Chars may be used. Information included in each item of i_Char is as follows.

Command: web login, information transmission, copy, paste or the like commands.mykeyID: information about personal identification for an agent.

deviceID: information about identification for a device that transmits information through ultrasonic waves.

objectID: information about object access stored in Cloud.

Token: password information for allowing only a certain device among receiving devices, i.e., a registered device to receive information.

According to an exemplary embodiment, the mobile terminal 100 sends the approaching device 200 an ultrasonic signal, which contains the first authentication information, through a transmission (Tx) modulation process as shown in FIG. 3. Here, the mobile terminal 100 of the first exemplary embodiment to be described later may further send the device 200 the ultrasonic signal, which contains the second authentication information, through the modulation process as shown in FIG. 3.

Specifically, the mobile terminal 100 receives information about i_Char (401), and counts the number of i_Char and determines a value of char# (402). Further, char# and i_Char undergo error checking (403, 404), and constitute the packet 20 as shown in FIG. 2 (405). Then, the mobile terminal 100 determines a phase of the packet 20 (406), and finally generates the ultrasonic signal (407). The generated ultrasonic signal is returned to an operating system (OS) of the mobile terminal 100, for example, Android, and sent to the device 200 through the short-range communicator 130 (408).

The ultrasonic signal generated as above and sent to the device 200 is received in and demodulated by the device 200, which will be minutely shown in FIG. 3. The demodulation process for the ultrasonic signal will be described again in association with the device 200 to be described later.

Meanwhile, an exemplary embodiment may employ various short-range communication methods as well as the ultrasonic-wave communication. For example, wireless communication such as Data over sound, Data over light-emitting diode (LED), Wi-Fi, Bluetooth, near field communication (NFC), radio frequency (RF) communication, infrared communication, etc., or wired communication using universal serial bus (USB), an audio jack, etc. may be employed.

The first storage 140 stores data without limitation under control of the first controller 160. The first storage 140 may be achieved by a flash-memory or the like nonvolatile storage medium. The first storage 140 is accessed by the first controller 160, and data of the first storage 140 may be read, recorded, modified, deleted, updated, etc., by the first controller 160.

The data stored in the first storage 140 may, for example, include an OS for operating the mobile terminal 100, various applications executable under the OS, image data, additional data, etc.

The first storage 140 according to an exemplary embodiment stores the first authentication information for the device authentication, and may further store the registered device information for identifying the device targeted for the authentication. Here, the first authentication information may contain ID and/or PW as user account information (i.e., the information about the personal identification).

Meanwhile, the first storage 140 may further store the second authentication information for service authentication. The second authentication information may contain ID and PW for using, in other words, logging in to a certain application (for example, Facebook, Naver, etc.) installed in the device 200.

In this exemplary embodiment, the application includes a web browser such as Google Chrome, Safari, etc., and the second authentication information contains ID and PW for login as the web browser is executed. Also, the second authentication information contains ID and PW for accessing, i.e., logging on to a web page (or site) corresponding to a certain uniform resource locator (URL) input through the web browser or a web-application.

Further, in this exemplary embodiment, the application includes an application that provides a civil service issued by the government and a financial service issued by a financial institution such as a bank. In this case, the second authentication information may further include public certification information for using the civil service or the financial service.

According to an exemplary embodiment, the first storage 140 further stores third authentication information for using the mobile terminal 100. The third authentication information may contain: biometrics information such as pulses, fingerprints, etc.; a confidential access number; a combination lock number; a pattern; etc. so that only a registered user can use the mobile terminal 100.

In this exemplary embodiment, the mobile terminal 100 needs more enhanced security because it stores the device authentication information and/or the service authentication information with respect to the device 200. Accordingly, the authentication based on the biometrics information restricts the use of the mobile terminal 100 to be allowed for only a user who is registered through the authentication, and also prepares for the loss of the mobile terminal 100.

The first user authenticator 150 uses the third authentication information stored in the first storage 140, and authenticates a user of the mobile terminal 100. The first user authenticator 150 may include an authentication module that authenticates an actual user of the mobile terminal 100 through pulses, fingerprints or the like biometrics information in accordance with a predetermined algorithm.

The first network communicator 160 performs network communication with the cloud server 300. The first network communicator 160 includes a wired/wireless communication module capable of performing the network communication with the outside such as Internet.

The first controller 170 performs control with regard to various elements of the mobile terminal 100. For example, the first controller 170 performs control corresponding to the command from the first input section 110, and control for transmitting/receiving data in the first short-range communicator 130 or the first network communicator 160, thereby controlling general operations of the mobile terminal 100.

Specifically, the first controller 170 sends the corresponding device 200 the first authentication information stored in the first storage 140 through the first short-range communicator 130 if it is sensed that the mobile terminal 100 approaches the device 200. The first controller 170 determines whether the device 200 targeted for approaching is a registered device by referring to the registered device information previously stored in the first storage 140, and sends the corresponding registered device 200 the relevant first authentication information if the device 200 is the registered device.

Here, a proximity sensor (not shown) is provided at one side (for example, a front upper portion) of the mobile terminal 100 and senses an approach to the device 200. Thus, the approach of the device 200 targeted for approaching is sensed, and a sensed result is sent to the first controller 170. Also, as necessary, the first controller 170 may be achieved to send the first authentication information to the approaching device 200 when a certain button provided in the mobile terminal 100 is operated.

Meanwhile, in the first exemplary embodiment, if it is sensed that a predetermined application requiring login is executed, the first controller 170 may send the corresponding device 200 the second authentication information for using the corresponding application. This will be described in more detail with reference to FIG. 2.

As shown in FIG. 1, the device 200 includes a second input section 210, a second output section 220, a second short-range communicator 230, a second storage 240, a second user authenticator 250, a second network communicator 260, and a second controller 270.

Here, if the device 200 is achieved by a display apparatus such as a TV, the device 200 includes an image processor (not shown) for processing an image signal, and the image signal to be processed may include a broadcasting signal, a signal received from an external device, data received through Internet or the like network, data stored in a flash memory, a hard disk drive, or the like nonvolatile storage medium. The image processor applies various preset image processes to the image signal and then outputs it to the display (not shown), so that the display can display an image.

The second input section 210 receives a user's input, and transmits various preset control commands or non-limited information to the second controller 270 in response to the received user's input.

The second input section 210 may include one or at least two physical keypads, i.e., buttons provided in the device 200, and a virtual keypad, i.e., a user interface (UI) displayed to be selected by a user on a display (not shown). Here, if the display is a touch screen, the second input section 210 sends the second controller 270 a command corresponding to a user's input received when the user touches the UI, and the second input section 210 receives a user's input based on interaction with contents displayed on the touch screen, i.e., a touch or a touch gesture.

The touch screen may receive a single touch or multi touches through a user's body (for example, a thumb and fingers) or a touchable input unit (not shown). To this end, the second input section 210 may for example include an input unit such as a pointing device, a stylus, etc. to touch a capacitive, resistive and electromagnetic induction type touch screen or input a character or the like through the virtual keyboard. A user uses the input unit or fingers to touch or select an object (for example, a menu, a text, an image, a moving image, a figure, an icon and a shortcut icon) displayed on the touch screen of the device 200.

The second controller 270 or a separately provided touch screen controller (not shown) converts an analog signal corresponding to a single touch or multi touches received through the touch screen into a digital signal (for example, X and Y coordinates corresponding to a detected touch position). The second controller 270 uses the converted digital signal to calculate X and Y coordinates corresponding to the touch position on the touch screen, thereby controlling the touch screen.

A user's touch includes drag, flick, drag & drop, tap, long tap, double tap, etc.

Also, if the device 200 is a digital device capable of performing voice recognition, the second input section 210 may further include a microphone.

The second output section 220 may include the display (not shown) for displaying an image, and a sound output section (not shown) for outputting voice or sound. The display may be for example achieved by various display types such as liquid crystal, plasma, an LED, an organic LED, a surface-conduction electron-emitter, a carbon nanotube, a nano-crystal, etc., but not limited thereto. The sound output section may include one or at least two speakers.

The second short-range communicator 230 may perform short-range communication with the mobile terminal 100. In this exemplary embodiment, the short-range communication may for example employ ultrasonic-wave communication.

According to an exemplary embodiment, the device 200 may receive an ultrasonic signal containing the first authentication information or the second authentication information from the mobile terminal 100. The received ultrasonic signal is recognized by the device 200 through a receiving (Rx) sound demodulation process as shown in FIG. 4.

Specifically, the ultrasonic signal received in the device 200 is stored in a buffer (501). Further, an information signal is cut from the stored signal (502), and a phase signal is compensated (503), thereby determining the phase (504). Then, a signal containing the first or second authentication information is finally extracted (507) through demodulation (505) and parity check (506). Such an extracted signal is returned to the OS of the device 200, for example, Android, and the second controller 270 recognizes the first or second authentication information, thereby performing the authentication.

Meanwhile, an exemplary embodiment may employ various short-range communication methods as well as the ultrasonic-wave communication. For example, wireless communication such as Data over sound, Data over LED, Wi-Fi, Bluetooth, near field communication (NFC), radio frequency (RF) communication, infrared communication, etc. or wired communication using universal serial bus (USB), an audio jack, etc. may be employed.

The second short-range communicator 230 receives the first authentication information for the device authentication from the mobile terminal 100. According to the first exemplary embodiment to be described later, the second short-range communicator 230 may further receive the second authentication information for service authentication with regard to a predetermined application from the mobile terminal 100.

The second storage 240 stores data without limitation under control of the second controller 270. The second storage 240 may be achieved by a flash-memory, a hard disk drive, or the like nonvolatile storage medium. The second storage 240 is accessed by the second controller 270, and data of the first storage 140 may be read, recorded, modified, deleted, updated, etc., by the second controller 270.

The data stored in the second storage 240 may for example include an OS for operating the device 200, various applications executable under the OS, image data, additional data, etc.

The second storage 240 may store touch information (for example, X and Y coordinates at the sensed touch position, a touch sensing time, etc.) corresponding to a touch and/or successive touch motions. The second storage 240 may store the kind of successive touch motions (for example, flick, drag, or drag & drop), so that the second controller 270 can compare an input user touch with the information of the second storage 240 and determine the kind of touches. In response to the input touch or the touch gesture, the second storage 240 may further store a visual feedback (for example, a video source, etc.) output to a touch screen 190 and recognizable by a user, an auditory feedback (for example, a sound source, etc.) output to a speaker and recognizable by a user, a tactile feedback (for example, a haptic pattern, etc.) recognizable by a user.

In this exemplary embodiment, the term of 'storage' may refer to the first and second storages 140 and 240; a read only memory (ROM) or a random access memory (RAM) provided in the controllers 170 and 270; or a memory card (not shown) mounted to the mobile terminal 100 or the device 200 (for example, a micro SD card, a memory stick). The first and the second storages 140 and 240 may include, for example, a nonvolatile memory, a volatile memory, a hard disk drive (HDD), or a solid state drive (SSD).

According to an exemplary embodiment, the second storage 240 may store information about the registered mobile terminal for identifying the mobile terminal 100 where the first authentication information for the device authentication is stored. Also, the second storage 240 may further store information about the authenticated user of the device 200 corresponding to the first authentication information.

The second user authenticator 250 authenticates a user of the device 200, based on the first authentication information received through the second short-range communicator 230.

Here, the second user authenticator 250 may authenticate a plurality of users for one device 200. For example, if a plurality of family members 1, 2 and 3 uses one device 200 and the member 1 makes his/her own mobile terminal 100 (e.g., a cellular phone) approach the device 200, the first authentication information of the member 1 is transmitted to the device 200 and thus the authentication is performed with regard to the corresponding user. Likewise, if the member 2 makes his/her own mobile terminal 100 (e.g., a wristband) approach the device 200, the authentication is performed with regard to the corresponding user. Here, the device 200 may provide a login screen (i.e., a customized screen) corresponding to each of the plurality of users.

The second network communicator 260 performs the network communication with the cloud server 300. The second network communicator 260 includes a wired/wireless communication module capable of performing the network communication with the outside such as Internet. Here, according to the second exemplary embodiment to be described later, the second network communicator 260 may further receive the second authentication information for service authentication with regard to a predetermined application from the cloud server 300.

The second controller 270 performs control with regard to various elements of the device 200. For example, the second controller 270 performs control corresponding to the command from the second input section 210, and control for transmitting/receiving data in the second short-range communicator 230 or the second network communicator 260, thereby controlling general operations of the device 200.

Specifically, the second controller 270 receives the first authentication information from the mobile terminal 100 approaching the device 200 through the second short-range communicator 230. Here, the second controller 270 determines whether the approaching mobile terminal 100 is a mobile terminal previously registered as an authentication device of the device 200 by referring to the registered mobile terminal information previously stored in the second storage 240, and receives the corresponding first authentication information if the mobile terminal 100 is the registered mobile terminal.

Meanwhile, according to the first exemplary embodiment, if a predetermined application is executed in the device 200 and the executed application requires the login, the second controller 270 may further receive the second authentication information for using the corresponding application from the registered mobile terminal 100. This will be described in more detail with reference to FIG. 2.

Also, according to the second exemplary embodiment, if a predetermined application is executed in the device 200 and the executed application requires the login, the second controller 270 may further receive the second authentication information for using the corresponding application from the registered cloud server 300. This will be described in more detail with reference to FIG. 3.

As shown in FIG. 1, the cloud server 300 includes a third storage 340, a third network communicator 360 and a third controller 370.

The third storage 340 provides the cloud service and stores various data for managing the mobile terminal 100 and the device 200. Referring to FIG. 1, the third storage 340 is achieved by a database where data is stored and managed, and the database may include a user authentication region 341 where user authentication information is stored for authentication and use authority of the mobile terminal and devices targeted for offering service and management, a clipboard region 342 where clipboard data extracted by a user command executed in the mobile terminal and/or device is stored, a web-hard region 343 which is provided for a user to store the data.

The user authentication region 341 includes registered information about the mobile terminal 100 and/or one or more devices 200 to be used by a user. The cloud server 300 provides the cloud service based on the data stored in the clipboard region 342 and web-hard region 343, and a user can be authenticated to use the cloud service by checking information about the user authentication region 341 through the mobile terminal 100 or the device 200.

Here, according to the second exemplary embodiment, the second authentication information for the service authentication (user login) of the application to be executed in the device 200 is further stored in the user authentication region 341 of the third storage 340 of the cloud server 300. This will be described in more detail with reference to FIG. 3.

The third network communicator 360 performs the network communication with the mobile terminal 100 and/or the device 200. The third network communicator 360 includes a wired/wireless communication module capable of performing the network communication with the outside such as Internet.

A user uses the mobile terminal 100 or the device 200 to access the clipboard region 342 and web-hard region 343 of the third storage 341 through the third network communicator 360.

The third controller 370 generally controls the cloud server 300. For example, the third controller 370 manages the mobile terminal 100 and the device 200, and controls operations corresponding to the access of the mobile terminal 100 or the device 200 through the third network communicator 360 to be performed, that is, necessary data to be provided to the mobile terminal 100 or the device 200.

Below, the first to third exemplary embodiment will be described in more detail with reference to the accompanying drawings.

FIG. 5 is a view showing a user authentication system according to a first exemplary embodiment.

In the first exemplary embodiment, the mobile terminal 100 storing the user authentication information is used to perform the user authentication with regard to the device 200 in such an intuitive method of opening a door with a key.

The mobile terminal 100 may allow the user information for accessing various services performed in the device 200 to be added/deleted, thereby serving as a key holder.

In this exemplary embodiment, the user authentication to the device 200 through the mobile terminal 100 is called MyKey Identification, MyKey Service, or MyKey Login.

As shown in FIG. 5, the mobile terminal 100 stores and manages ID/PW for the MyKey Service as the device authentication information (i.e., the first authentication information).

Also, the mobile terminal 100 stores and manages Web/Apps ID/PW for logging on to various applications or web-pages to be executed in the device 200. The second authentication information may be managed in the first storage 140 according to the corresponding applications or web-pages. For example, a web URL according to the web pages, ID/PW corresponding to a web page title, an application (App) name according to the applications, and ID/PW corresponding to the application type may be managed respectively.

Accordingly, without inputting information about a user to the device 200, the user can be authenticated through the mobile terminal 100 (i.e., the device authentication), and the service authentication is performed with regard to various applications (hereinafter, referred to as 'Apps') of the device 200 so that personal customized service can be provided.

Specifically, if the mobile terminal 100 approaches the device 200 in such a manner that a user puts the mobile terminal 100 to the device 200, the user authentication is automatically performed by transmitting the first authentication information stored in the mobile terminal 100 to the device 200 through the short-range communication, with no password input to the device 200. Here, the mobile terminal 100 determines whether an approaching device 200 is a registered device, and transmits the first authentication information to the approaching device 200 only when the device 200 is determined as the registered device.

The device 200 receives the first authentication information from the mobile terminal 100, and performs the user authentication based on the received information. Here, the device 200 may performs the authentication for the corresponding user with regard to the use of the cloud service provided by the device 200. To this end, the device 200 accesses the cloud server 300 in the state that the MyKey service operates as a background, and checks the user information of the mobile terminal 100 and the device 200 stored in the user authentication region 341.

Thus, a user can execute the application and use various services such as accessing a web page, etc. in the device 200 where the device authentication is completed and the MyKey service is operating as the background.

Here, if a service desired to be used by a user requires additional service authentication, the device 200 transmits information about the executed application and information (address) of a web page desired for the access to the mobile terminal 100 through the short-range communication, and requests the corresponding authentication information.

The mobile terminal 100 checks whether the device 200 is the registered device based on the received information, and if there is the second authentication information corresponding to the related services (AppName, AppType, WebURL, Web Title, etc.), the corresponding second authentication information is transmitted from the mobile terminal 100 to the device 200 through the short-range communication. Based on the received second authentication information, the device 200 performs the auto login (refer to Web/Apps Login of FIG. 2) with regard to the corresponding service.

Thus, according to the first exemplary embodiment, although the second authentication information for accessing the application/web page is not stored in the device 200, the auto login to the corresponding service is enabled, thereby further strengthening the security of the device 200.

Figure 6:
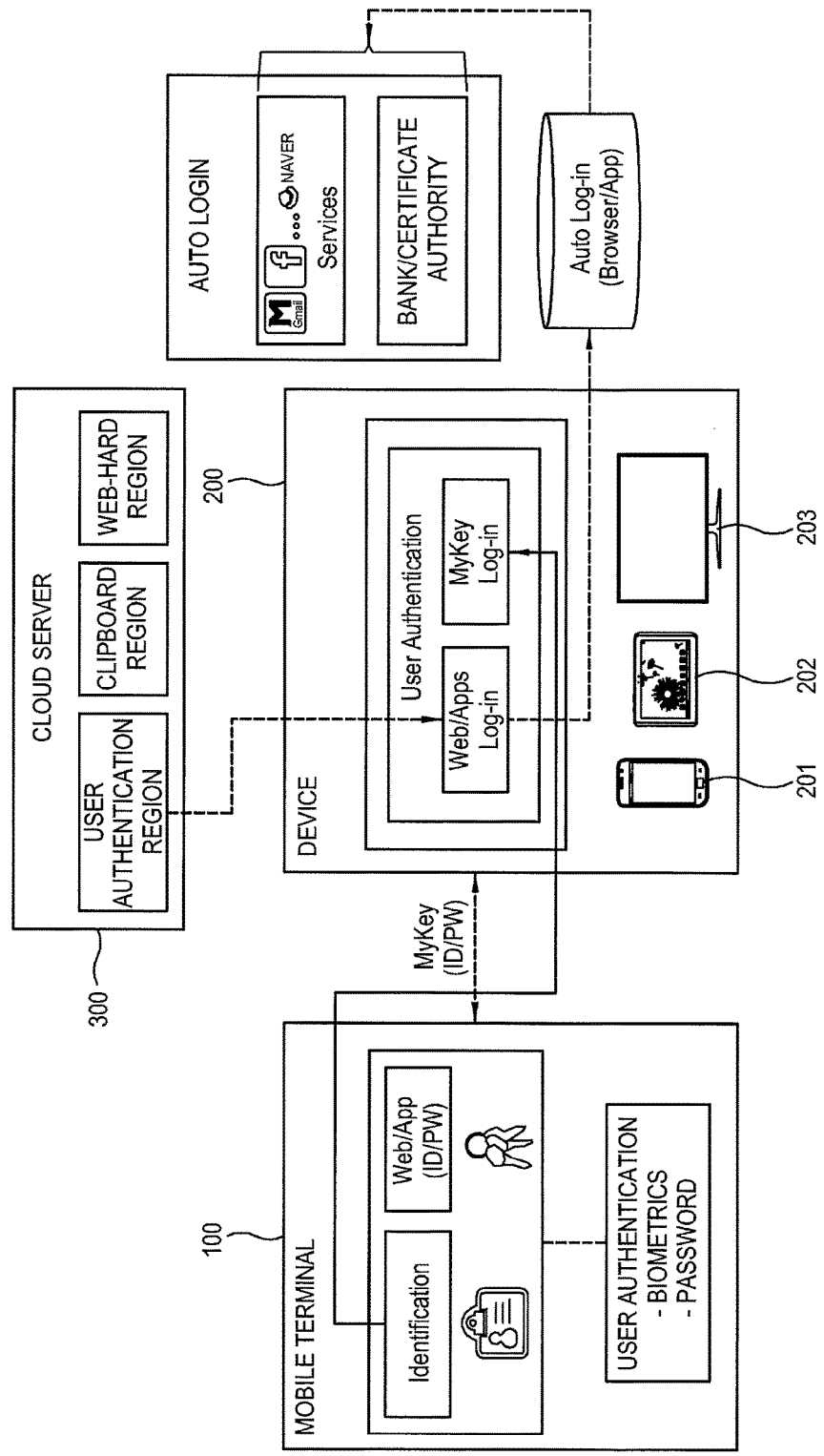
FIG. 6 is a view showing a user authentication system according to a second exemplary embodiment.

FIG. 6 is a view showing a user authentication system according to a second exemplary embodiment.

As compared with the user authentication system shown in FIG. 2, the user authentication system according to the second exemplary embodiment shown in FIG. 6 is characterized in that the second authentication information is stored in the cloud server 300. Therefore, detailed descriptions about the device authentication based on the first authentication information will be omitted to avoid repetitive descriptions.

As shown in FIG. 3, the mobile terminal 100 stores and manages ID/PW for the MyKey service as the device authentication information (i.e., the first authentication information).

The cloud server 300 stores and manages the Web/Apps login ID/PW (i.e., the second authentication information) for various applications to be executed in the device 200 or for accessing the web pages. The second authentication information may be managed according to the corresponding applications or web pages in the user authentication region 341. For example, a web URL according to the web pages, ID/PW corresponding to a web page title, an application (App) name according to the applications, and ID/PW corresponding to an application type may be managed.

Thus, the device 200 can authenticate a user (i.e., the device authentication) through the mobile terminal 100 without separately receiving any information about the user, and perform service authentication about various applications (hereinafter, referred to as 'App') of the device 200 by accessing the cloud server 300, thereby providing a personal customized service.

Specifically, if the mobile terminal 100 approaches the device 200 in such a manner that a user puts the mobile terminal 100 to the device 200, the user authentication is automatically performed by transmitting the first authentication information stored in the mobile terminal 100 to the device 200 through the short-range communication, with no password input to the device 200.

The device 200 receives the first authentication information from the mobile terminal 100, and performs the user authentication based on the received information. Here, the device 200 may further authenticate the use of the cloud service provided for a user while the MyKey service is operating as the background.

The authentication of the cloud service may be performed as the device 200 transmits the first authentication information received from the mobile terminal 100 to the cloud server 300 through the second network communicator 360, and the cloud server 300 compares the received first authentication information with the information of the user authentication region 341. The cloud server 300 notifies the device 200 of the authentication results of the cloud service.

In the device 200 where the device authentication is completed and the MyKey service is operating as the background, a user executes the application and uses various services such as access to a web page, etc.

Here, if a service desired to be used by a user requires additional service authentication, the device 200 transmits information about the executed application or the information (address) about the accessing web page to the cloud server 300 and requests the corresponding second authentication information.

The cloud server 300 determines whether the device 200 is the registered device based on the received information, and if there is the second authentication information corresponding to the relevant service (AppName, AppType, WebURL, Web Title, etc.), transmits the corresponding second authentication information to the device 200 through the network communication. The device 200 uses the received second authentication information to perform the auto login (refer to Web/Apps Login of FIG. 2) with regard to the corresponding service.

Thus, according to the second exemplary embodiment, the auto login is possible without storing the second authentication information for the application/web-page access in the device 200, thereby further strengthening the security of the device 200.

Figure 7:
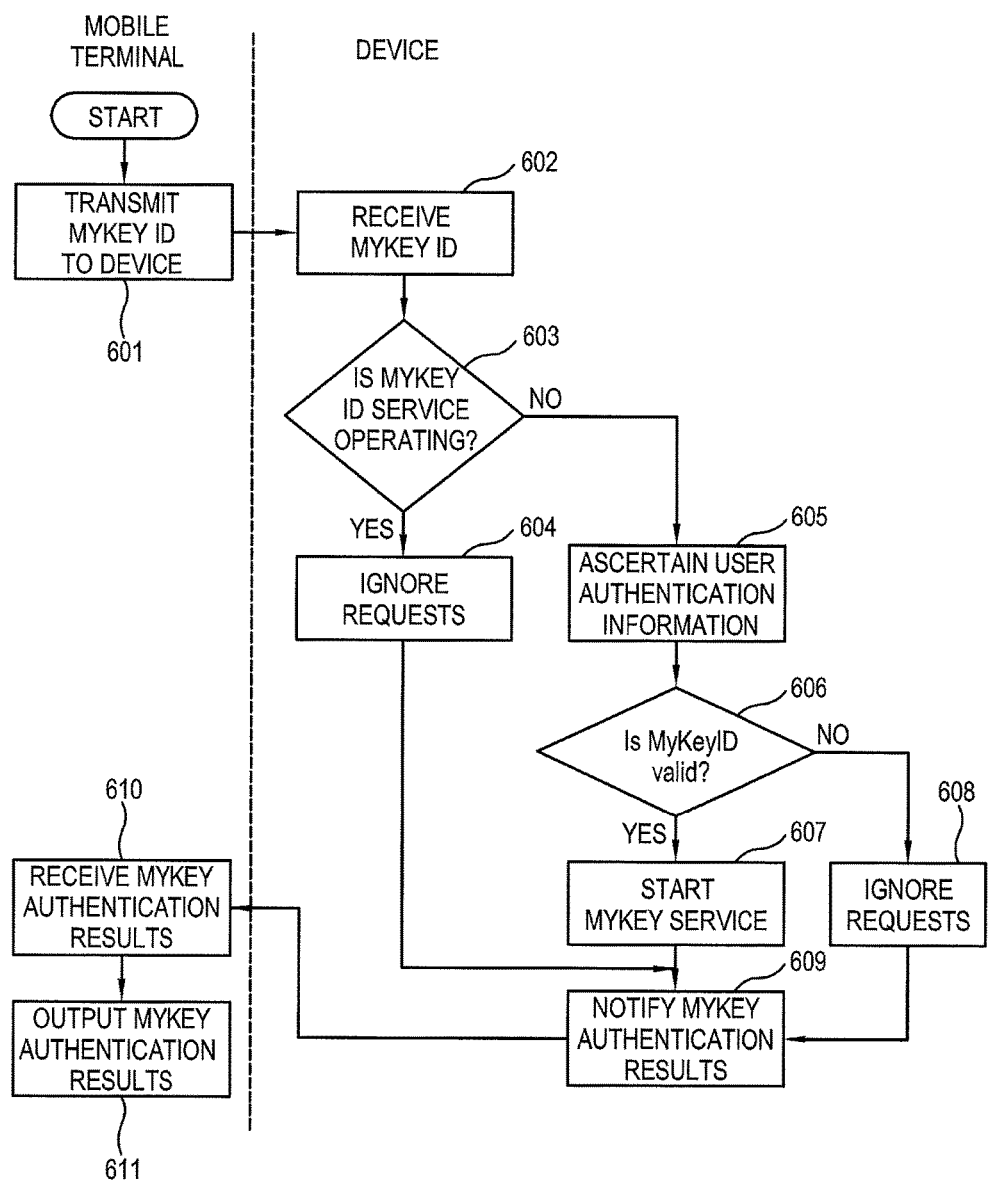
FIG. 7 is a flowchart showing a device authentication process according to the first or second exemplary embodiment.

FIG. 7 is a flowchart showing a device authentication process according to the first or second exemplary embodiment.

As shown in FIG. 7, the mobile terminal 100 transmits the first authentication information (MyKey ID) to the device 200 through the short-range communication in response to the approach to the device 200 (601).

The device 200 receives the first authentication information MyKey ID from the mobile terminal 100 (602).

Meanwhile, the second controller 270 determines whether the current MyKey service is operating as the background in the device 200 (603).

Here, if the MyKey service is operating, in other words, if the authentication for using the device 200 has already been performed, the device 200 ignores the request for the first authentication information (604), and notifies the mobile terminal 100 of the results (i.e., that the device has already been authenticated).

On the other hand, if the MyKey service is not operating, in other words, if the device authentication is needed, the second user authenticator 250 ascertains the user authentication information through the first authentication information, thereby performing the device authentication (605). Here, the second user authenticator 250 of the device 200 compares the received first authentication information with the information previously stored in the device 200, and thus performs the device authentication. Also, the second controller 270 transmits the first authentication information to the cloud server 300, thereby further performing the authentication for the use of the cloud service.

In accordance with the ascertainment of the user authentication, it is determined whether the first authentication information MyKey ID is valid or not (606).

If it is determined that the first authentication information is valid, the MyKey service starts (607) and the mobile terminal 100 is notified of the MyKey authentication result (607).

Also, if it is determined that the first authentication information is invalid, the device 200 ignores the requests for the first authentication information (608).

The mobile terminal 100 receives the MyKey authentication results from the device 200 (610), and outputs the results through the first output section 120 (611).

Figure 8:
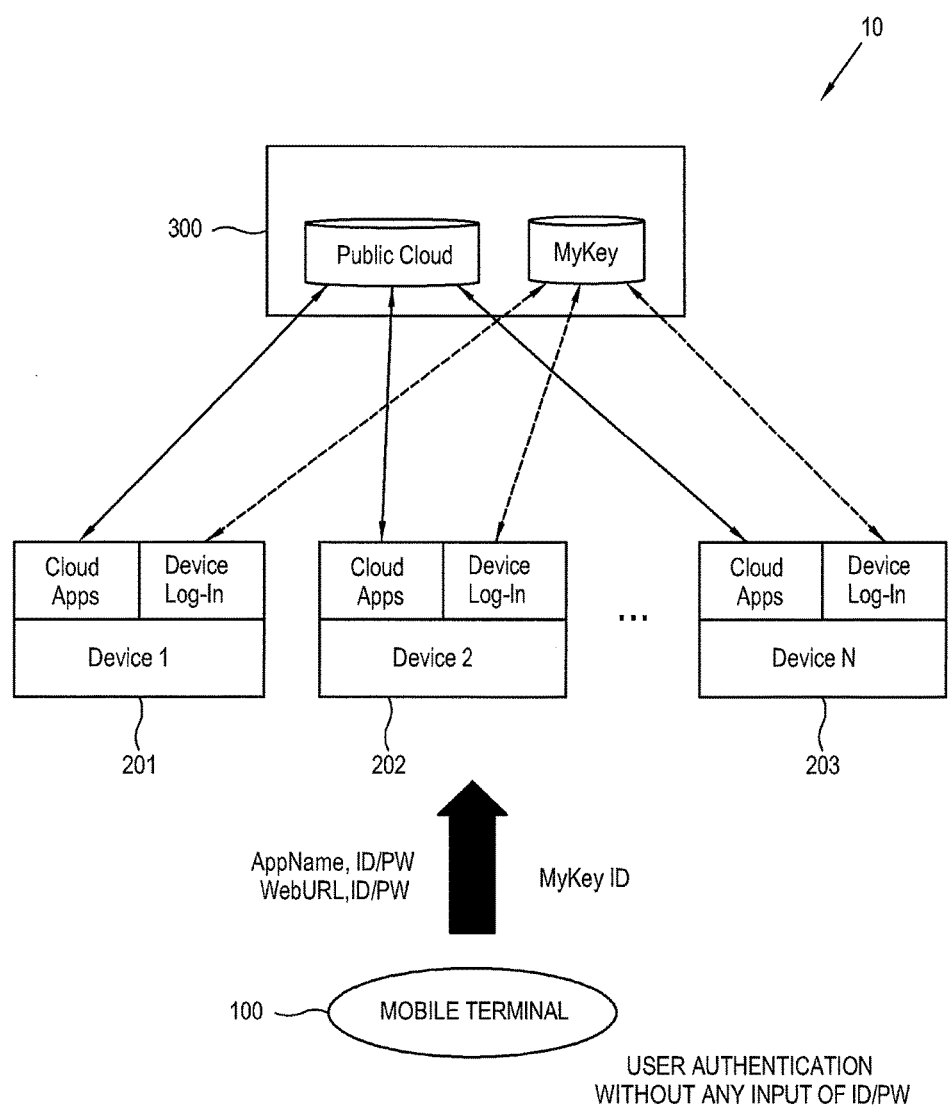
FIG. 8 is a view showing an example of a device authentication system including a plurality of devices in the first and second exemplary embodiments.

FIG. 8 is a view showing an example of a device authentication system 10 including a plurality of devices 201, 202 and 203 in the first and second exemplary embodiments.

As shown in FIG. 8, the mobile terminal 100 transmits the first authentication information MyKey ID to the plurality of devices 201, 202 and 203 through the short-range communication, and the plurality of devices 201, 202 and 203 each uses the received first authentication information to perform the device authentication, that is, the device login. Here, the first authentication information respectively transmitted to the plurality of devices 201, 202 and 203 may be different according to the corresponding devices. Also, a plurality of users may log in to one device (e.g., the device 202) as being independent of one another.

Accordingly, without directly inputting ID/PW in the device 200, the user authentication is possible through the mobile terminal 100.

The plurality of devices 201, 202 and 203 transmits the first authentication information received as shown in FIG. 8 to the cloud server 300, and further performs the login for the cloud service. Thus, the plurality of devices 201, 202 and 203 may access the cloud server 300 through a cloud application.

As above, if the device login is performed by the mobile terminal 100, the device 200 may provide a screen customized corresponding to a login user.

Figure 9:
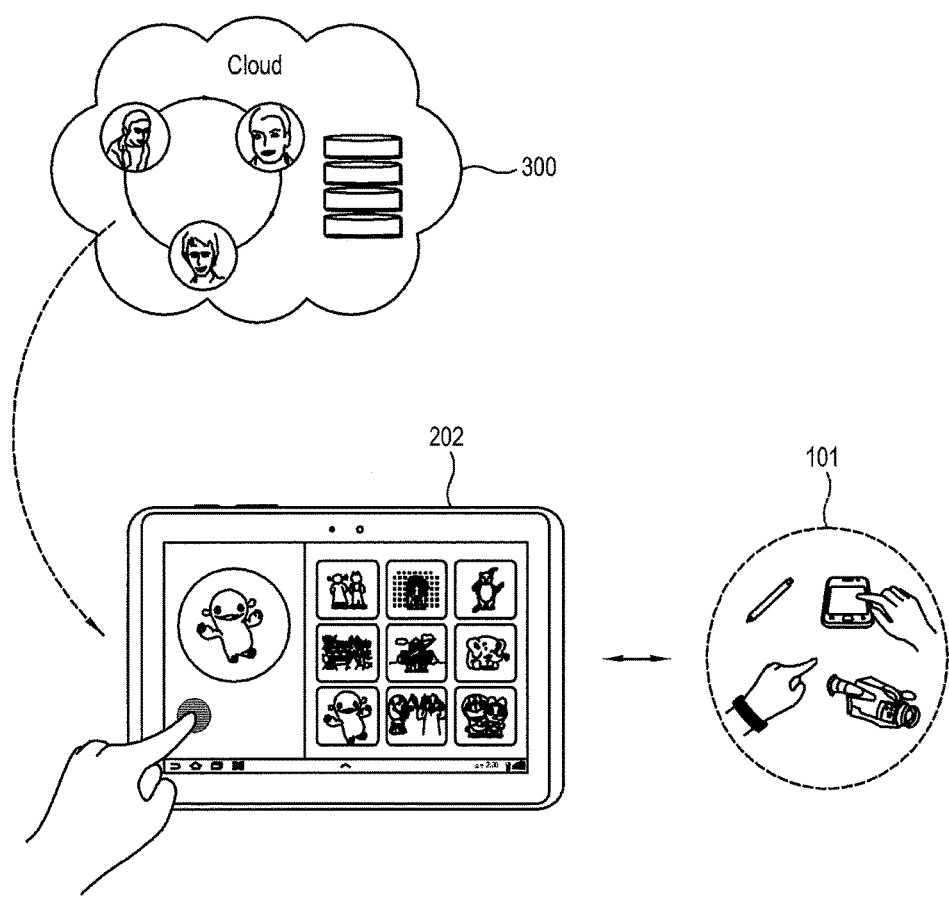
FIGS. 9 to 11 are views showing embodiments where a screen customized for a user is provided in accordance with a device login.
Figure 10:
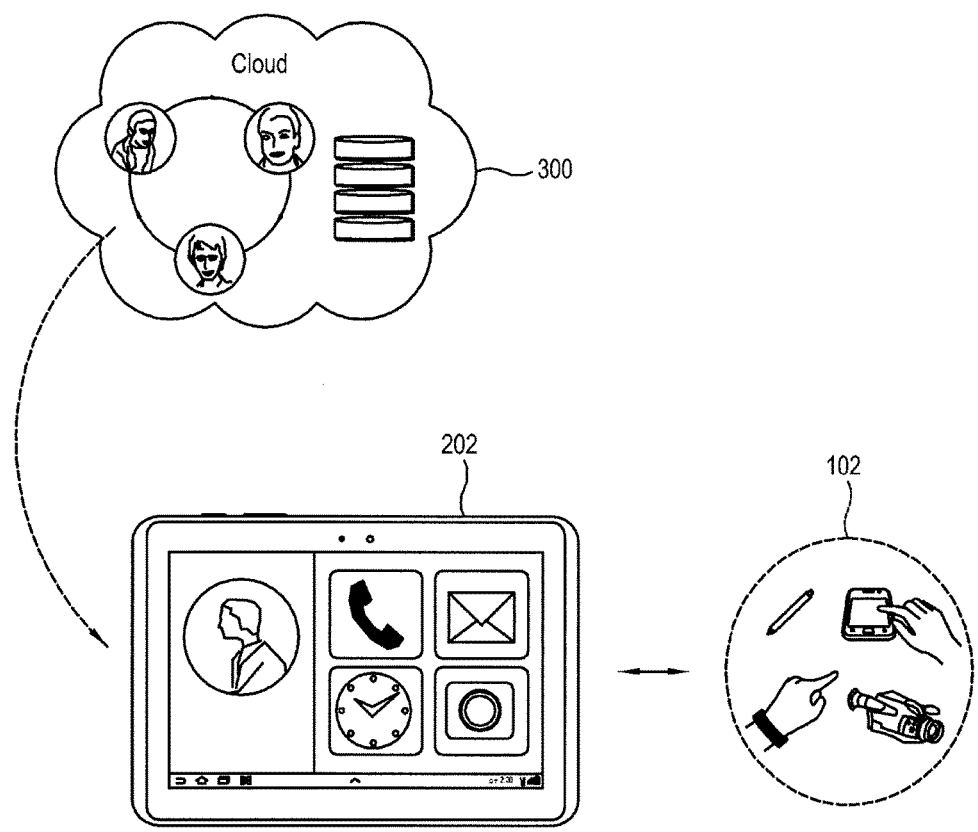
Figure 11:
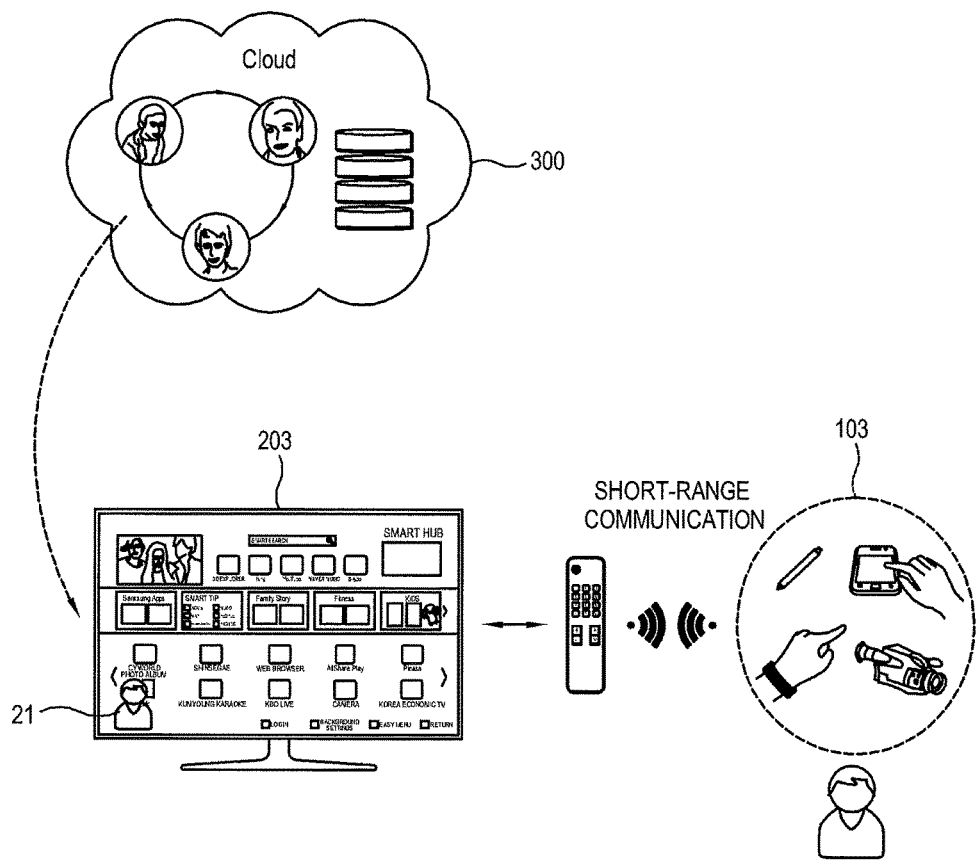

FIGS. 9 to 11 are views showing embodiments where a screen customized for a user is provided in accordance with a device login;

As shown in FIG. 9, if the mobile terminal 101 to which a user is registered as a child approaches the device (e.g., a tablet PC) 202, the first authentication information corresponding to a child is transmitted to the device 202 through the short-range communication, thereby performing the device authentication. Thus, the second controller 270 controls the second output section 220 to provide a screen only for children. Here, the second controller 270 accesses the cloud server 300 through the second network communicator 260, and ascertains whether a user corresponding to the first authentication information is a child or not, thereby receiving the ascertainment results and providing the screen only for the children. The screen only for the children may offer a user interface (UI) corresponding to an application only for children.

Likewise, as shown in FIG. 10, if the mobile terminal 102 to which a user is registered as an old man approaches the device (e.g., a tablet PC) 202, the first authentication information corresponding to an old man is transmitted to the device 202 through the short-range communication, thereby performing the device authentication. Thus, the second controller 270 controls the second output section 220 to provide a screen only for an old man. Here, the second controller 270 accesses the cloud server 300 through the second network communicator 260, and ascertains whether a user corresponding to the first authentication information is an old man or not, thereby receiving the ascertainment results and providing the screen only for the old man. The screen only for the old man may be characterized in that a UI such as an icon, a text, etc. may be enlarged and displayed.

Meanwhile, as shown in FIG. 11, although the device 203 is a smart TV shared by family members, a customized screen customized for each of the family members may be provided in response to the login of each member. For example, if the mobile terminal 103 to which a user is registered as a father approaches the device 202 (e.g., the smart TV or a remote controller provided as a user input device for the smart TV, the first authentication information corresponding to a father is transmitted to the device 203 through the short-range communication, thereby performing the device authentication. Thus, the second controller 270 controls the second output section 220 to further display an icon 21 of a user who logs in to an initial screen. Here, the second controller 270 accesses the cloud server 300 through the second network communicator 260, and ascertains a user corresponding to the first authentication information, thereby receiving the results and providing a screen containing the icon 21 of the corresponding user. Then, the user selects the icon 21 and uses various services such as the cloud service.

Figure 12:
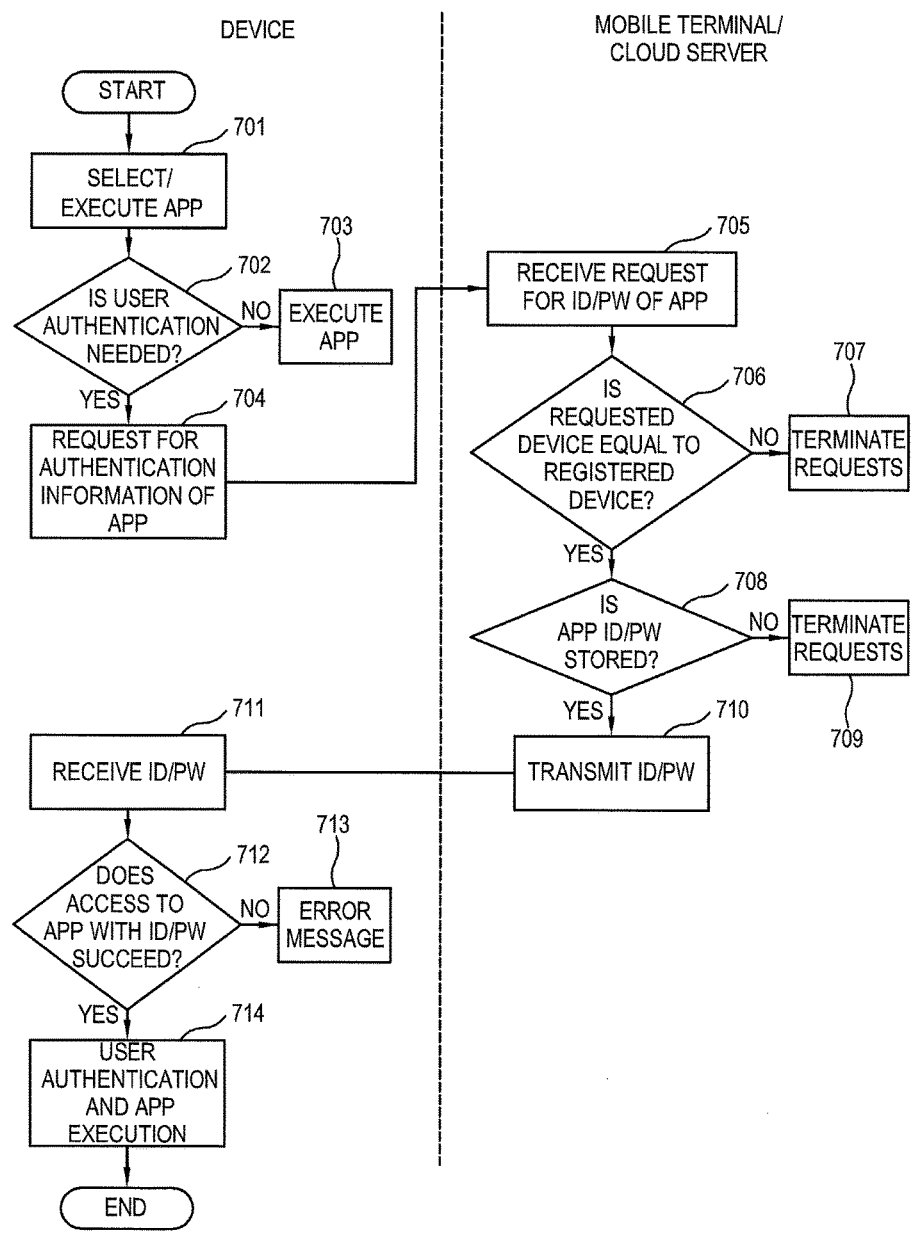
FIGS. 12 and 13 are flowcharts showing a service authentication process according to the first or second exemplary embodiment.
Figure 13:
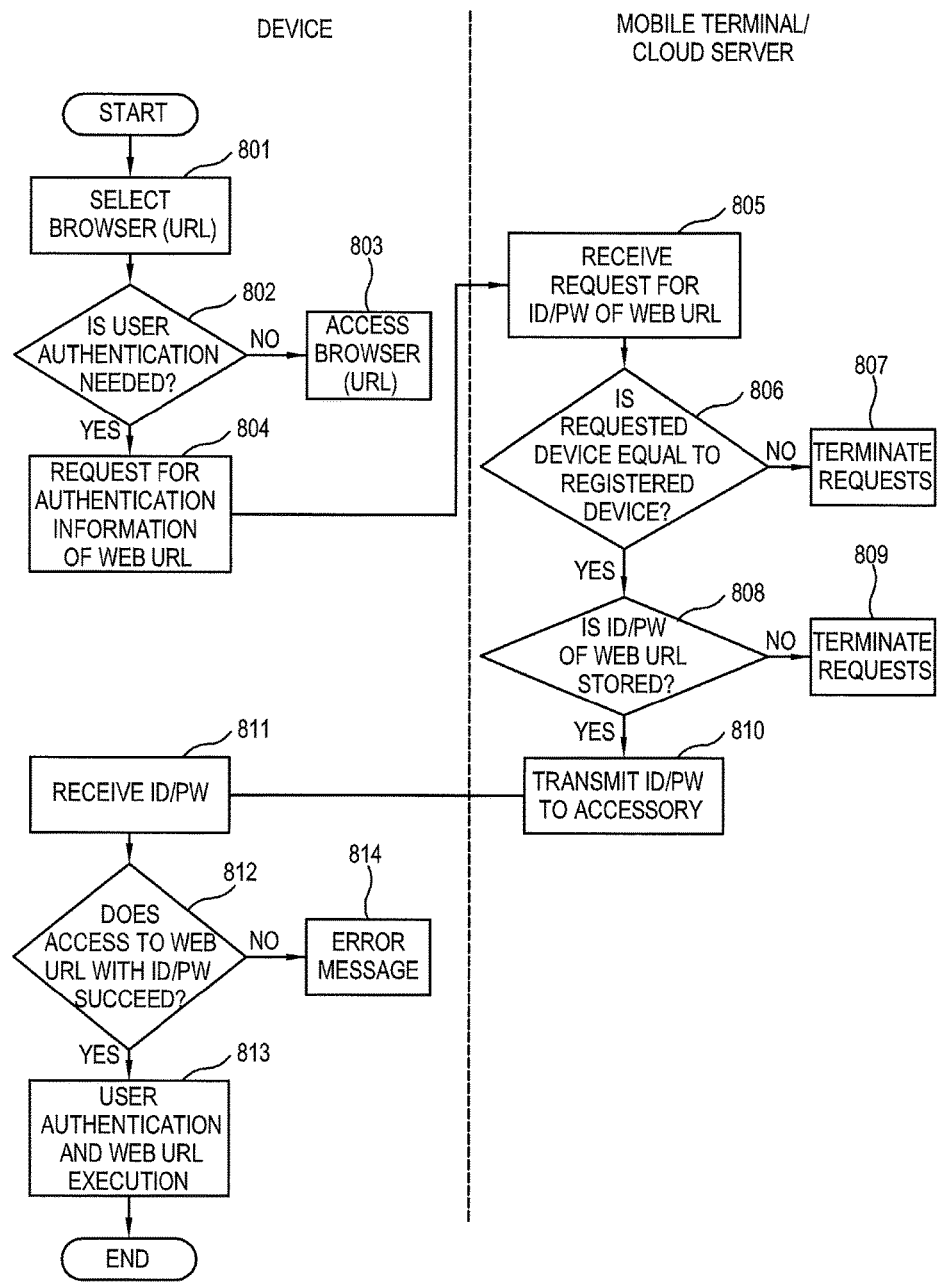

FIGS. 12 and 13 are flowcharts showing a service authentication process according to the first or second exemplary embodiment;

As shown in FIG. 12, a predetermined application (App) may be selected by a user and executed in the device 200 where the device authentication is performed (701).

The device 200 determines whether the selected and executed application requires the user authentication, i.e., a separate login (702).

If the corresponding application does not require the user authentication, the second controller 270 executes the selected application and provides a user with the application service (703).

Here, if the corresponding application needs the user authentication, the second controller 270 requests for the authentication information (or the second authentication information) of the selected and executed application to the mobile terminal 100 through the first short-range communicator 130, or requests for the authentication information (or the second authentication information) of the selected and executed application to the cloud servicer 300 through the first network communicator 160 (704).

The mobile terminal 100 or the cloud server 300 receives the request for the second authentication information, i.e., the ID/PW of the executed application from the device 200 (705), and determines whether the device 200 requesting for the authentication information is a registered device or not (706).

If the requesting device 200 is not the registered device, the requests for the second authentication information are terminated (707).

On the other hand, if the requesting device is the registered device, it is determined whether the ID/PW corresponding to the executed application is stored in the mobile terminal 100 or the cloud server 300 receiving the request (708).

Here, if the ID/PW corresponding to the executed application is not stored, the requests for the second authentication information are terminated (709).

On the other hand, if the ID/PW corresponding to the application is stored, the corresponding ID/PW is transmitted to the device 200 (710).

The device 200 receives the ID/PW corresponding to the executed application from the mobile terminal 100 or the cloud server 300 (711), and uses the received ID/PW to access, i.e., log in to the application (712).

Here, if the access to the application does not succeed, in other words if the received ID/PW is wrong, the results are output as an error message through the second output section 220 (711).

On the other hand, if the access to the application succeeds, in other words if the received ID/PW is correct, the user authentication and the application are normally implemented (714).

The authentication process of FIG. 12 may be applied to a case where the corresponding application is a web browser or the web browser accesses a web site (URL) requiring a separate login.

Specifically, as shown in FIG. 13, a predetermined browser or web site may be selected by a user and executed/accessed in the device 200 where the device authentication is performed (801).

The device 200 determines whether the selected and executed/accessed web site (i.e., a home site due to browser execution, for example, Google.com) requires user authentication, that is, a separate login (802).

If the address (web URL) of the corresponding web site does not require the user authentication, the second controller 270 executes the browser and/or access the corresponding URL, thereby providing a web browsing service to a user (803).

Here, if the corresponding web URL requires the user authentication, the second controller 270 requests for the authentication information (i.e., the second authentication information) to the mobile terminal 100 through the first short-range communicator 130, or requests for the authentication information (i.e., the second authentication information) to the cloud server 300 through the first network communicator 160 (804).

The mobile terminal 100 or the cloud server 300 receives the request for the second authentication information, i.e., the ID/PW of the web URL from the device 200 (805), and determines whether the device 200 requesting for the authentication information is the registered device (806).

If the requesting device 200 is not the registered device, the requests for the second authentication information are terminated (807).

On the other hand, if the requesting device is the registered device, it is determined whether the cloud server 300 or the mobile terminal 100 receiving the request stores the ID/PW corresponding to a web URL desired for access (808).

Here, if the ID/PW corresponding to the web URL desired for the accessing is not stored, the requests for the second authentication information are terminated (809).

On the other hand, if the ID/PW is stored corresponding to the web URL, the corresponding ID/PW is transmitted to the device 200 (810).

The device 200 receives the ID/PW corresponding to the web URL desired for the access from the mobile terminal 100 or the cloud server 300 (811), and uses the received ID/PW to access, i.e., log on to the corresponding URL (812).

Here, if the access to the web URL does not succeed, in other words if the received ID/PW is wrong, the results are output as an error message through the second output section 220 (814).

On the other hand, if the access to the web URL, in other words if the received ID/PW is correct, the user authentication and the execution of the web browser and/or the access to the web site are normally implemented (813).

Figure 14:
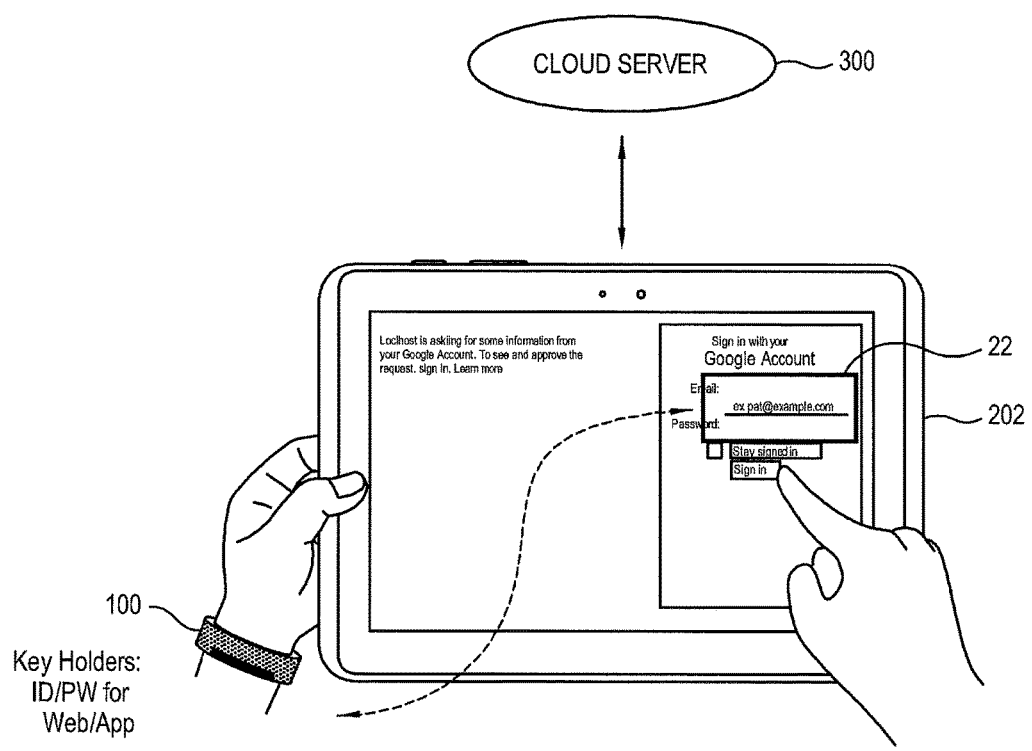
FIG. 14 is a view showing an embodiment where service authentication is performed according to the first or second exemplary embodiment.

FIG. 14 is a view showing an embodiment where service authentication is performed according to the first or second exemplary embodiment.

As shown in FIG. 14, if a user executes the application/the web browser through the device (e.g., a tablet PC) 202 and the executed application/web browser needs a separate login, the second authentication information may be requested to the mobile terminal 100 or the cloud server 300.

For example, if a user executes the web browser in the device 202 and accesses 'Google.com', a login 22 for using the corresponding web site (for example, e-mail) is required. In this exemplary embodiment, the ID/PW for the login to 'Google.com' is not stored in the device 202, and the ID/PW is requested to and received from the mobile terminal 100 or the cloud server 300. Further, the received ID/PW is employed, and it is thus possible to use the login and the corresponding service (e-mail).

FIG. 15 is a view showing a cloud system according to a third exemplary embodiment.

In the third exemplary embodiment, the mobile terminal 100 using the user authentication information is used in accessing the cloud server 300, and the cloud service provided by the cloud server 300 is available through the devices 201, 202 and 203. Here, the cloud service includes a clipboard service and a web-hard service (hereinafter, referred to as a 'storage service').

In the clipboard service, clipboard data is stored in the clipboard storage region 342 of the cloud server 300 in accordance with a user's input stored or copied (for example, copy & paste) to a clipboard in the mobile terminal 100 or the devices 201, 202 and 203, and the stored clipboard data is provided as a list to a user through at least one devices 201, 202 and 203. The clipboard data may include a note, a picture, a moving picture, a web link, contact information, etc.

In the clipboard service according to this exemplary embodiment, the clipboard data selected by one of the devices to be stored to the clipboard may be pasted or executed in another device. For example, the clipboard data stored in accordance with the copy & paste command in the mobile terminal 100 may be checked or downloaded in a predetermined device 201. Also, the clipboard data generated in one of the devices 201 may be accessed by another device 202 as necessary.

The clipboard storage region 342 stores and manages the clipboard data according to users, and a user may use the clipboard service in such a manner of selecting a necessary item in his/her own clipboard list displayed on at least one devices 201, 202 and 203.

The web-hard service provides a data storage space to a user. A user may select a predetermined file of the mobile terminal 100 or at least one devices 201, 202 and 203 to be stored in a web hard, and the corresponding file is stored in the web-hard region 343 of the cloud server 300 so that a user can access it. The web-hard storage region 343 stores and manages files according to users, and a user may use the web-hard service in such a manner of selecting a necessary item in his/her own clipboard list displayed on at least one devices 201, 202 and 203.

As shown in FIG. 15, the mobile terminal 100 according to the third exemplary embodiment receives the authentication results from the devices 201, 202 and 203 and requests the cloud server 300 to provide the clipboard or web-hard information stored in the cloud to the devices 201, 202 and 203 if it is determined that the device authentication is completed. Here, the first controller 170 of the mobile terminal 100 transmits a command for extracting the information for the cloud service and implementing the information to at least one devices 201, 202 and 203 through the first short-range communicator 130. The second controller 270 of the devices 201, 202 and 203 receiving the command may store the extracted information in the cloud server 300, or controls the second network communicator 260 to receive the stored information of the cloud server 300 in the devices 201, 202 and 203 and execute it.

If the device authentication based on the first authentication information received from the mobile terminal 100 is completed, the devices 201, 202 and 203 access the cloud server 300 through the second network communicator 260 and checks user profile information, thereby receiving information for the cloud service (e.g., the clipboard and web-hard information).

The second controller 270 of the devices 201, 202 and 203 controls the second output section 220 to display a user interface (UI, hereinafter referred to as a cloud UI or a MyKey screen) 30 that provides the cloud service based on the received information. The cloud UI 30 displayed on the devices 201, 202 and 203 provides cloud information containing the clipboard data and/or web-hard state information to a user in accordance with the requests of the mobile terminal 100.

Also, the cloud UI 30 may be additionally provided with advertisements or information related to the data stored in the cloud server 300. That is, the cloud server 300 may analyze the clipboard data and/or web-hard data stored corresponding to users, and additionally provide the cloud UI 30 with a related trend preferred by a user in accordance with text analysis results. Also, the advertisement information according to the types of stored contents may be additionally provided to the cloud UI 30. For example, for a user who generally stores a music file, advertisement related to a record may be additionally provided to the cloud UI 30.

The cloud server 300 provides the cloud service to the mobile terminal 100 and at least one devices 201, 202 and 203. To this end, the cloud server 300 registers and manages information about a user, the mobile terminal 100, the devices 201, 202 and 203, and determines whether the user is valid or not when the mobile terminal 100 tries to access the cloud of the devices 201, 202 and 203. In the case of the valid user, the cloud service based on the information stored corresponding to him/her (e.g., the clipboard data and/or web-hard data) is provided.

The storage 340 of the cloud server 300 includes the clipboard region 342 where the clipboard data is stored, and the web-hard region 343 where the web-hard data is stored. The clipboard region 342 stores the clipboard data requested to be stored by the device, and the stored clipboard data can be provided to the mobile terminal 100 and the devices 201, 202 and 203. The web-hard region 343 provides a certain space of the cloud server 300 to a user, in which the user can access the web-hard with the user information (i.e., the first authentication information) of the mobile terminal 100.

Figure 16:
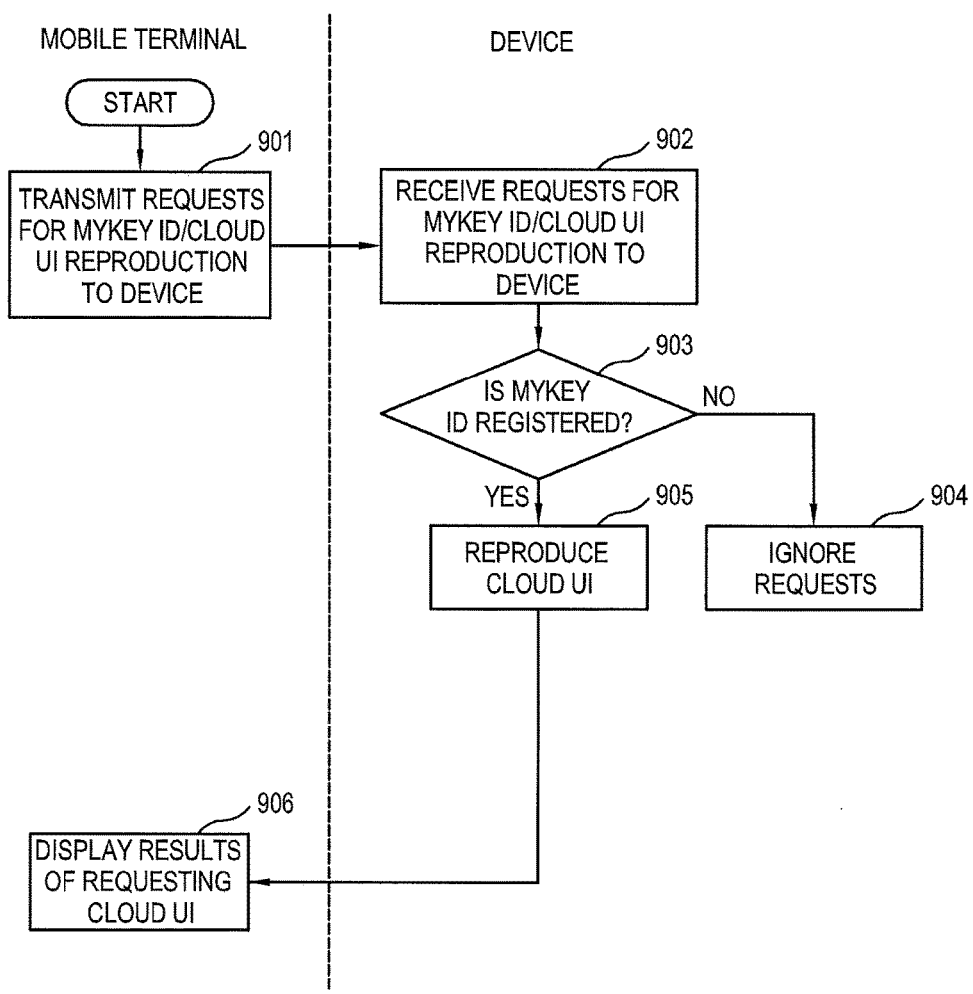
FIG. 16 is a flowchart showing a process of providing a cloud service according to the third exemplary embodiment.

FIG. 16 is a flowchart showing a process of providing a cloud service according to the third exemplary embodiment.

As shown in FIG. 16, the mobile terminal 100 may transmit the first authentication information (e.g., MyKey ID) for the device authentication and a reproduction request of the cloud UI 30 providing the cloud service to the authenticated device 200 (901). Here, the MyKey ID and the reproduction request for the cloud UI 30 may be transmitted at the same time or at different points of time.

Regarding to this, the device 200 receives the MyKey ID and the reproduction request for the cloud UI 30 from the mobile terminal 100 (902).

Further, the device 200 transmits the first authentication information to the cloud server 300 and determines whether it is of the registered ID (903).

If it is determined that the MyKey ID is not registered, the requests related to the reproduction of the cloud UI 30 are ignored (904).

On the other hand, if it is determined that the MyKey ID is registered, the second controller 270 receives information about a cloud UI 30 of a user corresponding to the checked MyKey ID from the cloud server 300 through the first network communicator 140, and reproduces the cloud UI 30 through the second output section 220 (905).

Then, the mobile terminal 100 is notified of the reproduction results of the cloud UI 30 according to the request of the mobile terminal 100, and the results thereof are displayed through the first output section 120 of the mobile terminal 100 (906).

FIGS. 17 to 22 are views showing embodiments where the device provides the cloud UI 30 to a user.

Figure 17:
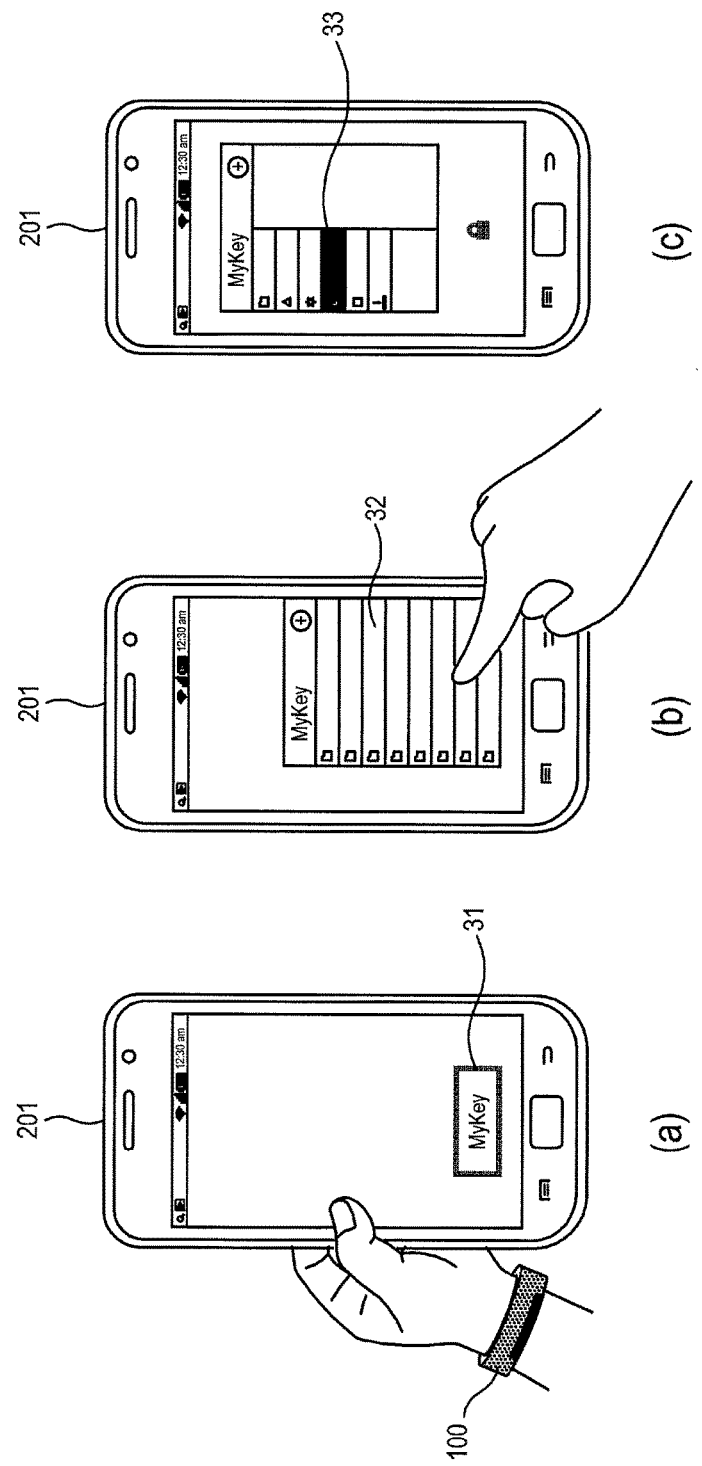
FIGS. 17 to 22 are views showing embodiments where the device provides a cloud user interface (UI) to a user.
Figure 18:
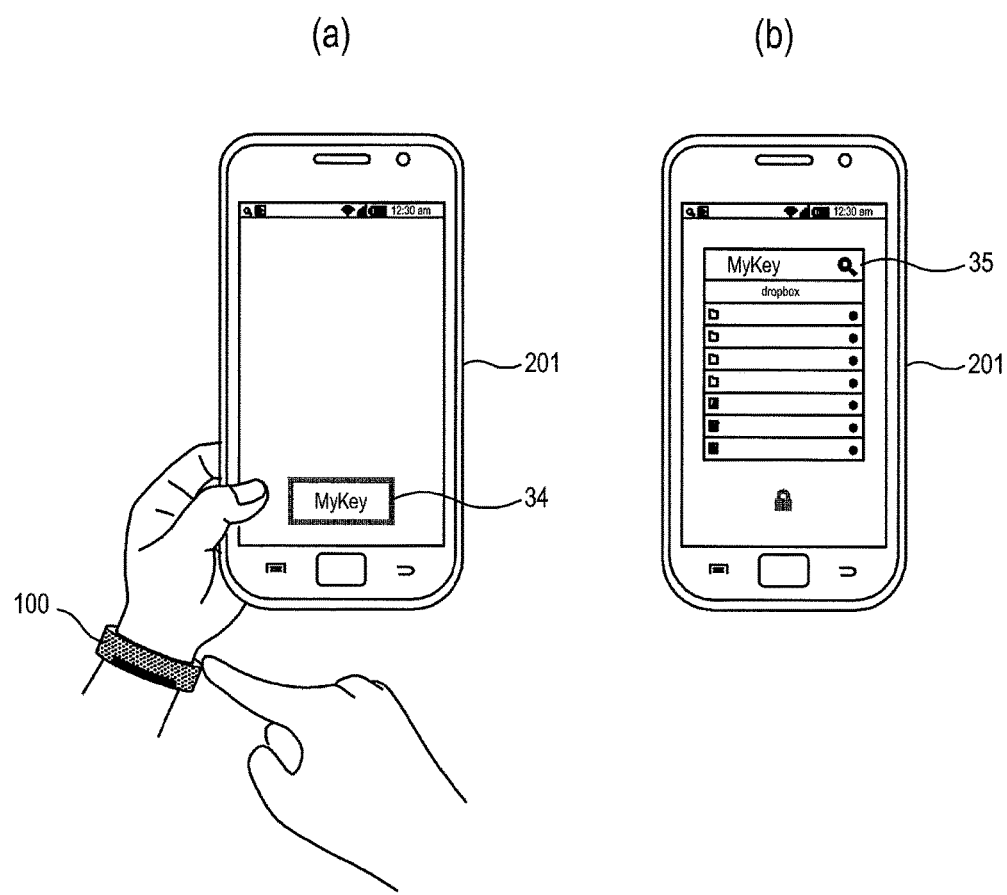
Figure 19:
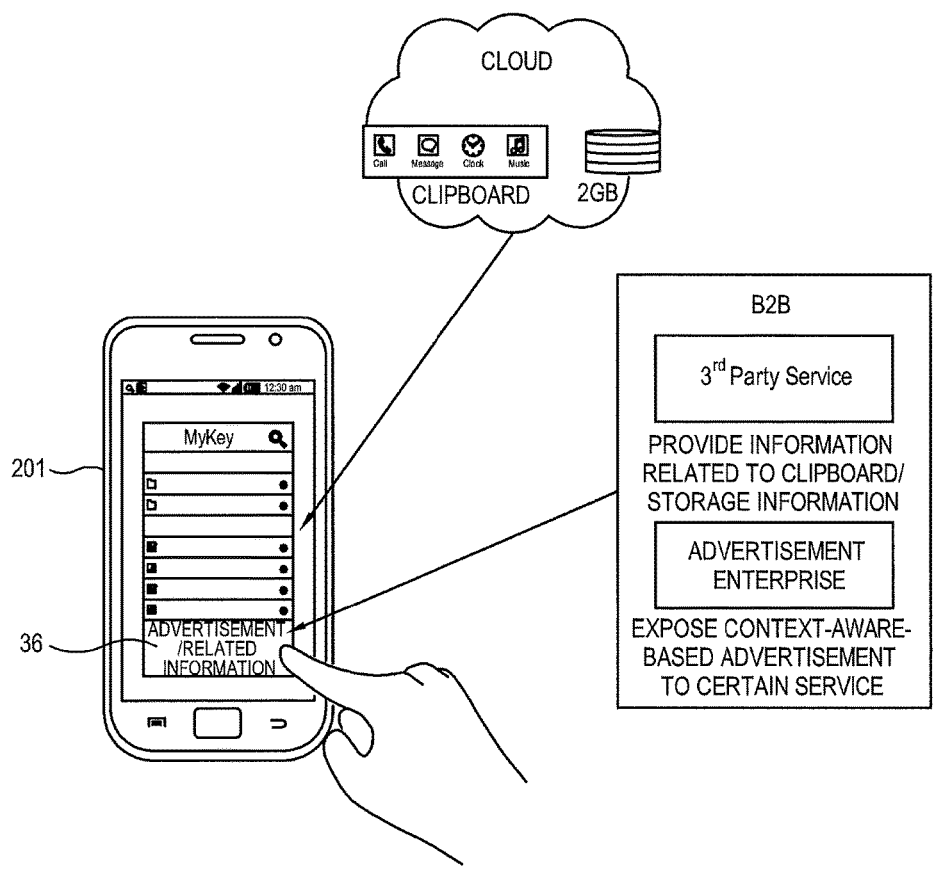

FIGS. 17 to 19 show the exemplary embodiments where the clipboard UI is displayed on the device 201 in accordance with the implementation of the cloud service.

As shown in FIG. 17, the device 201 may access the cloud server 300 so as to receive the clipboard service in response to the requests of the mobile terminal 100. Thus, an icon (e.g., a MyKey icon) 31 may be displayed as the cloud UI 30 for directly accessing a user's cloud on the second output section 220 of the device 201 (refer to FIG. 17(a). Here, if a user selects the MyKey icon 31, the whole list view 32 for the data stored in the clipboard region 342 of the cloud server 300 may be displayed as shown in FIG. 17(b), or a category view 33 may be displayed as shown in FIG. 17(c). Also, in accordance with user settings, the whole list view 32 or the category view 33 may be immediately displayed when the device 201 accesses the cloud server 300.

Here, the cloud UIs 31, 32 and 33 of FIG. 17 are provided regardless of the states of the application being executed in the device 201, and their positions are variable within the second output section 220. Also, a user can be informed that the device 201 performs cloud access, through the first output section 120 of the mobile terminal 100.

Likewise, as shown in FIG. 18, in response to the request from the mobile terminal 100, the device 201 may access the cloud server 300 in order to receive the web-hard service. Thus, the icon (e.g., the MyKey icon) 34 may be displayed as the cloud UI 30 for directly accessing a user's cloud on the second output section 220 of the device 201 (refer to FIG. 18(a)). Here, if a user selects the MyKey icon 34, a storage view 35 for the data stored in the web-hard region 343 of the cloud server 300 may be displayed as shown in FIG. 18(b). Also, in accordance with user settings, the storage view 35 may be immediately displayed when the device 201 accesses the cloud server 300.

Here, the cloud UIs 34 and 35 of FIG. 18 are provided regardless of the states of the application being executed in the device 201, and their positions are variable within the second output section 220. Also, a user can be informed that the device 201 performs cloud access, through the first output section 120 of the mobile terminal 100.

In FIGS. 17 and 18, the clipboard service and web-hard service corresponding to the cloud access are respectively provided as corresponding cloud UIs, but not limited thereto. Alternatively, the device 201 may receive the clipboard and web-hard data as one cloud UI.

Meanwhile, as shown in FIG. 19, the cloud server 300 may further display additional information or advertisement related to the clipboard or web-hard information on the cloud UI 36. For example, if the clipboard or web-hard data is a text, URL information related to the corresponding text may be received from the cloud server 300 and provided. Also, in accordance with the types or contents of the clipboard or web-hard contents, related advertisement information may be added to the cloud UI 36. Here, the cloud server 300 may receive additional information or advertisement from another cloud service offering enterprise and provide it to the device 201.

Figure 20:
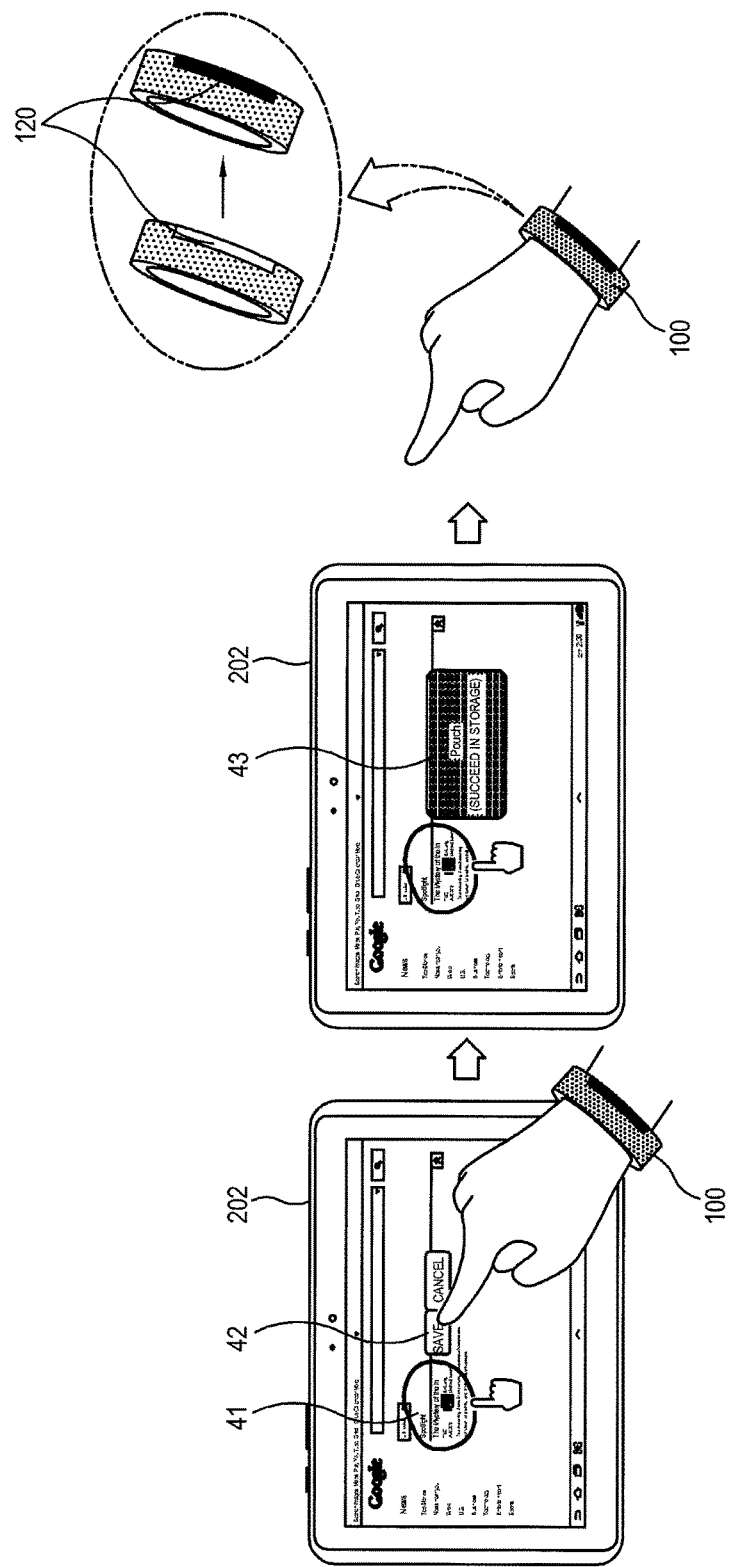
Figure 21:
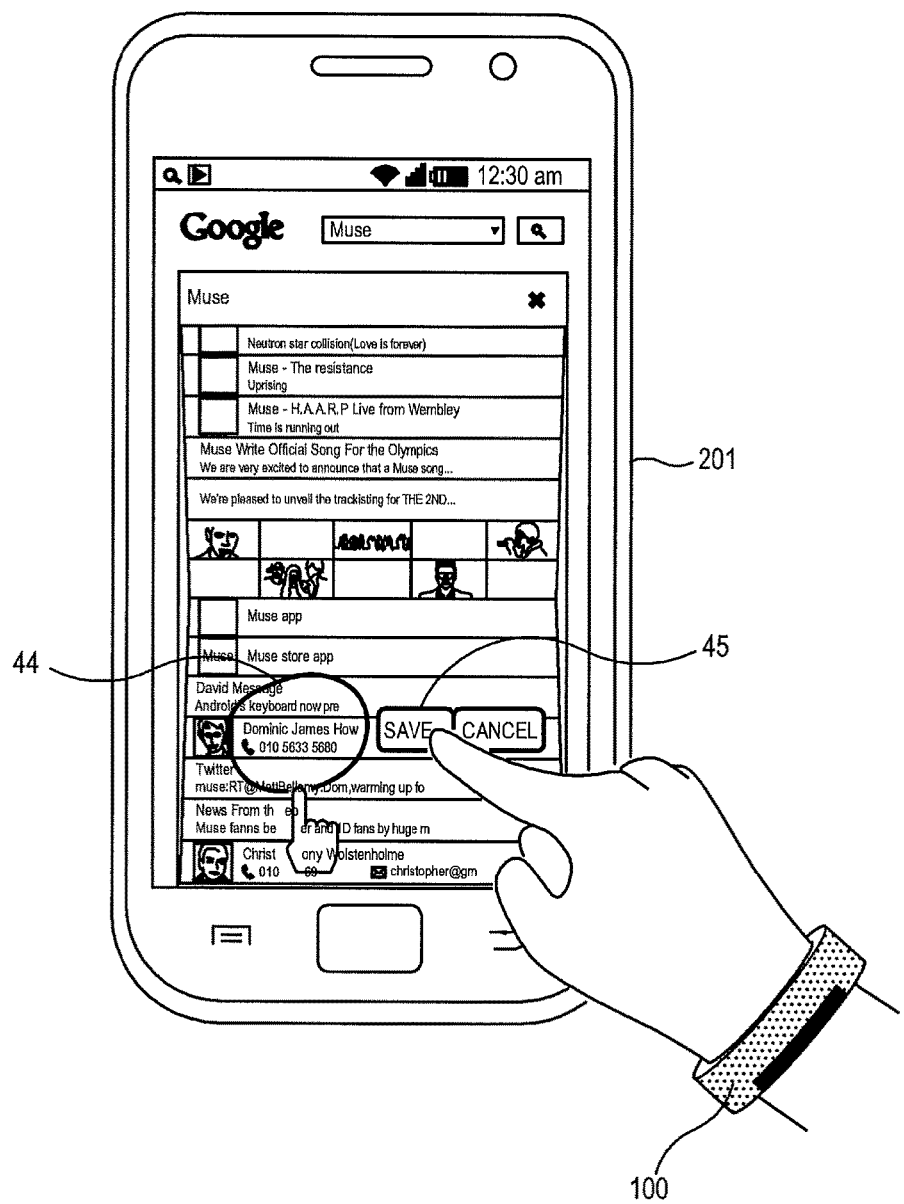

FIGS. 20 and 21 show exemplary embodiments where the devices 201, 202 stores data in a cloud clipboard.

As shown in FIG. 20, a user may set up a region of interest, desired to be stored to the clipboard, through an operation on the touch screen of the second output section 220 of the device 202, for example, through successive inputs corresponding to finger touches. The second controller 270 displays a pointer corresponding to a user's operation, i.e., a pointer 41 connecting a starting point of the touch with an ending point, on the second output section 220, and further displays a storage icon 42 selectable to store the information about the region of interest set up by the point 41 to the clipboard, on the second output section 220. Here, a user's request for the clipboard service is received through the mobile terminal 100, and correspondingly the device 200 can reproduce the pointer UI 41 on the first output section 220.

If a user selects the storage icon 42, the second controller 270 extracts information about the region of interest, for example, information about a text, an image, etc., and transmits it to the cloud server 200 through the second network communicator 260. Here, the second controller 270 may further store the extracted information about the region of interest in the second storage 240.

The cloud server 300 receives the extracted information through the third network communicator 360, stores it to correspond to a user of the device 202 in the clipboard region 342, notifies the device 202 of the results (e.g., succeed in storage), and displays a success message 43 on the second output section 220 of the device 202. Here, the device 202 may further notify the mobile terminal 100 of the storage of the clipboard data, and thus a user can be informed that new data is stored in a cloud clipboard through the first output section 120 of the mobile terminal 100.

In this exemplary embodiment, while extracting the information of the clipboard region, meta data information may be further extracted in addition to a text displayed on a screen.

As shown in FIG. 21, a user may set up a region of interest, desired to be stored to the clipboard, through successive inputs on the touch screen of the second output section 220 of the device 202. The second controller 270 displays a pointer corresponding to a user's operation, i.e., a pointer 44 connecting a starting point of the touch with an ending point, on the second output section 220, and further displays a storage icon 45 selectable to store the information about the region of interest set up by the point 441 to the clipboard, on the second output section 220.

If a user selects the storage icon 45, the second controller 270 extracts information about the region of interest, for example, information about meta data as well as a text, an image, etc. For instance, if a phone icon is included in the region of interest as shown in FIG. 21, information about a linked phone-number is further extracted. The extracted information is transmitted to the cloud server 200 through the second network communicator 260. Here, the second controller 270 may further store the extracted information about the region of interest.

Figure 22:
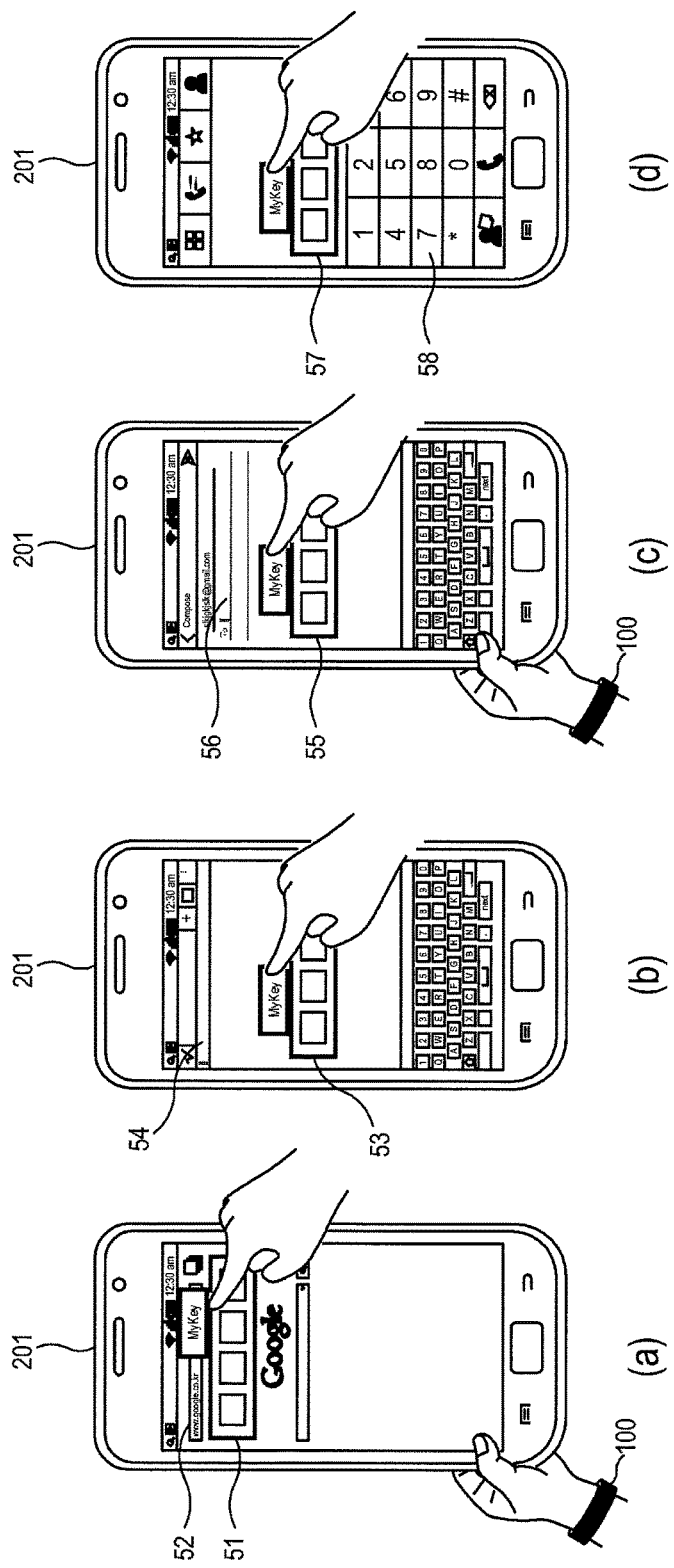

FIG. 22 shows an exemplary embodiment where the data stored in the cloud clipboard is provided in accordance with the implementing state of the device 201.

As shown in FIG. 22, a user may select the clipboard service to be implemented while a certain application is being executed in the device 201. Here, a user may control the mobile terminal 100 or the device 201 in order to select the clipboard service.

For example, if the clipboard service is selected while the web browser is being executed as shown in FIG. 22(a), the second controller 270 controls the second output section 220 to display the clipboard UI 51 in the vicinity of a browser URL input window 52. Here, a URL list stored in the clipboard region 342 is extracted and displayed on the clipboard UI 51.

Also, in this exemplary embodiment, the clipboard UI 51 may be displayed on a browser body, for example, in the vicinity of a search box.

As shown in FIG. 22(b), if the clipboard service is selected while a text editor for writing an e-mail, a note, etc. is being executed, a clipboard UI 53 may be displayed in the vicinity of a text input box 54, and a text list stored in the clipboard region 342 may be extracted and displayed on the clipboard UI 53.

In the same manner, if the clipboard service is selected while an e-mail application is being executed as shown in FIG. 22(c), a clipboard UI 55 may be displayed in the vicinity of an e-mail receiver input box 56, and an e-mail list may be extracted from the information stored in the clipboard region 342 and displayed on the clipboard UI 55.

Further, as shown in FIG. 22(d), if the clipboard service is selected while dialing is being executed, a clipboard UI 57 may be displayed in the vicinity of a keypad 58, and a contact information list is extracted from the information stored in the clipboard region 342 and displayed on the clipboard UI 55.

Thus, in this exemplary embodiment, the clipboard UI 51, 53, 55 or 57 is displayed in response to the operation state of the device 200, thereby improving a user's convenience.

Further, in this exemplary embodiment, a user can do the user authentication by an easy way of making the mobile terminal approach the device, without inputting the device authentication information (ID/PW) to the respective devices one by one even if the user uses any device.

Accordingly, as compared with the conventional case of memorizing and inputting the user authentication information, or storing the access information in the device being executed, the present exemplary embodiment is more convenient for a user and further strengthens the security.

Also, a wearable-computing based smart accessory is applied to a field of user recognition to thereby improve usability and a service access method.

Also, the intuitive cloud access using the mobile terminal and the cloud service utilizing method are provided, thereby providing the cloud information to the user in accordance with the execution state of the device, and improving a user's convenience.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A mobile terminal comprising:
a first communicator implemented by a communication circuit configured to communicate with a device by a short-range communication method;
a storage, implemented by a memory, configured to store information about a registered device and first authentication information corresponding to the registered device and second authentication information corresponding to at least one application that is executable in the device, the first authentication information and the second authentication information being managed in the storage corresponding to a first user among a plurality of users authorized to use the registered device; and
a processor configured to determine whether the device is the registered device if the mobile terminal approaches the device, and controls the first communicator to send the device the first authentication information corresponding to the device to authenticate the device if the device is determined to be the registered device, the device being activated for the first user corresponding to the first authentication information among the plurality of users based on authentication result of the device and offering a user interface (UI) customized for the first user,
wherein the processor is configured to receive a request for a second authentication information of a predetermined application executed in the device which is authenticated and activated for the first user using the first authentication information from the device through the first communicator, to determine the second authentication information of the predetermined application is stored in the storage, and to control the first communicator to send the device the second authentication of the predetermined application.

2. The mobile terminal according to claim 1, wherein the application comprises a web browser, and the second authentication information comprises user information of the first user for logging on to a web page accessed by the web browser.

3. The mobile terminal according to claim 1, further comprising a second communicator, implemented by a communication circuitry, configured to perform network communication with a cloud server managing user account information and providing a predetermined service based on the user account information, and an output section, implemented by a display panel or a speaker, to output a notification corresponding to at least one of generating, adding and modifying clipboard data or web-hard data stored in the cloud server,
wherein the processor is configured to controls the second communicator to make the mobile terminal access the cloud server so that the first user uses the predetermined service based on the user account information in response to authentication of the device using the sent first authentication information.

4. A device comprising:
a first communicator, implemented by a communication circuit, configured to communicate with a mobile terminal by a short-range communication method;
a storage configured to store information of a plurality of users authorized to use the device, and
a processor configured to determine whether the mobile terminal is a registered mobile terminal if the mobile terminal approaches the device, control the first communicator to receive the first authentication information corresponding to the device from the mobile terminal to authenticate the device if the mobile terminal is determined to be the registered device, and authenticate the device through the received first authentication information, the device being activated for a first user corresponding to the first authentication information among the plurality of users based on authentication result of the device and offering a user interface (UI) customized for the first user,
wherein the processor is configured to recognize execution of a predetermined application in the device which is authenticated and activated for the first user using the first authentication information, to control the first communicator to request for a second authentication information of the predetermined application to the mobile terminal and to receive the second authentication information of predetermined application from the mobile terminal, and to access the executed predetermined application using the received second authentication information of the predetermined application.

5. The device according to claim 4, further comprising a second communicator, implemented by a communication circuitry, configured to perform network communication with a cloud server managing user account information and providing a predetermined service based on the user account information,
wherein the second communicator receives from the cloud server second authentication information of the first user corresponding to another application that is executed in the device,
wherein the processor controls the second communicator to request and receive the second authentication information of another application from the cloud server in response to recognition of execution of the another application in the device.

6. The device according to claim 4, wherein the application comprises a web browser, and the second authentication information comprises user information of the first user for logging on to a web page accessed by the web browser.

7. The device according to claim 4, wherein the first communicator sends the mobile terminal a device authentication result based on the first authentication information.

8. The device according to claim 4, further comprising a second communicator, implemented by a communication circuitry, configured to perform network communication with a cloud server managing user account information and providing a predetermined service based on the user account information, and an output section, implemented by a display panel, configured to display a cloud user interface (UI) corresponding to the cloud service,
wherein the processor is configured to control the second communicator to make the device access the cloud server so that the first user uses the predetermined service based on the user account information in response to authentication of the device using the received first authentication information.

9. The device according to claim 8, wherein the first communicator further receives from the mobile terminal a reproducing request for the cloud UI, and
the processor controls the output section to display the cloud UI in response to the reproduction request from the mobile terminal.

10. The device according to claim 8, wherein the second communicator transmits the first authentication information to the cloud server, and receives an authentication result of the cloud service from the cloud server.

11. The device according to claim 8, wherein the predetermined service comprises at least one of a clipboard service and a web-hard service, and
the output section outputs a notification corresponding to at least one of generating, adding and modifying clipboard data or web-hard data stored in the cloud server.

12. The device according to claim 8, wherein the output section displays the cloud UI corresponding to an operation state of the device, wherein the cloud UI comprises a list of clipboard data stored in the cloud server, and the output section displays the clipboard data list by extracting data corresponding to an application installed in the device.

13. The device according to claim 8, wherein
the predetermined service comprises at least one of a clipboard service and a web-hard service, and
the cloud UI comprises at least one of additional information and advertisement information related to the clipboard service or web-hard service.

14. The device according to claim 8, wherein the processor sets up a region of interest to be stored in a clipboard with regard to successive motion of a user touch on a touch screen of the device, and controls the second communicator to store data of the region of interest in the clipboard of the cloud server.

15. The device according to claim 14, wherein the processor controls the second communicator to extract and transmit information about the region of interest to the cloud server.

16. A method of controlling a mobile terminal, the method comprising:
detecting that the mobile terminal approaches a device;
determining whether the device is a registered device, based on stored registered device information;
sending the device first authentication information corresponding to the device by a short-range communication method if the device is determined to be the registered device to authenticate the device, the device being activated for a first user corresponding to the first authentication information among a plurality of users authorized to use the device based on authentication result of the device and offering a user interface (UI) customized for the first user;
receiving a request for a second authentication information of a predetermined application executed in the device which is authenticated and activated for the first user using the first authentication information from the device;
determining the second authentication information of the predetermined application is stored in a storage, the first authentication information and the second authentication information being managed in the storage corresponding to the first user among a plurality of users; and
sending the device the second authentication of the predetermined application for the first user based on the determination result.

17. A method of controlling a device, the method comprising:
detecting that a mobile terminal approaches the device;
determining whether the mobile terminal is a registered mobile terminal, based on stored information about the registered mobile terminal;
receiving first authentication information corresponding to the device from the mobile terminal by a short-range communication method if the mobile terminal is determined to be the registered device
authenticating the device through the received first authentication information, the device being activated for a first user corresponding to the first authentication information among a plurality of users authorized to use the device based on authentication result of the device and offering a user interface (UI) customized for the first user;
recognizing execution of a predetermined application in the device which is authenticated and activated for the first user using the first authentication information;

sending request for a second authentication information of the predetermined application for the first user to the mobile terminal;
receiving the second authentication information of predetermined application for the first user from the mobile terminal; and
accessing the executed predetermined application using the received second authentication information of the predetermined application.

* * * * *